(12) United States Patent
Suzuki et al.

(10) Patent No.: US 10,918,944 B2
(45) Date of Patent: Feb. 16, 2021

(54) GAME SYSTEM WITH VIRTUAL CAMERA ADJUSTMENT BASED ON VIDEO OUTPUT CONNECTION STATUS AND SYSTEM ORIENTATION, AND COUNTERPART STORAGE MEDIUM HAVING STORED THEREIN GAME PROGRAM, GAME APPARATUS, AND GAME PROCESSING METHOD

(71) Applicant: NINTENDO CO., LTD., Kyoto (JP)

(72) Inventors: Toshiaki Suzuki, Kyoto (JP); Miyuki Hirose, Kyoto (JP); Misaki Hiraga, Kyoto (JP); Yoshiaki Onishi, Kyoto (JP); Atsushi Nakao, Nagasaki (JP); Nobuya Wada, Nagasaki (JP)

(73) Assignee: Nintendo Co., Ltd., Kyoto (JP)

( * ) Notice: Subject to any disclaimer, the term of this patent is extended or adjusted under 35 U.S.C. 154(b) by 14 days.

(21) Appl. No.: 16/382,384

(22) Filed: Apr. 12, 2019

(65) Prior Publication Data
US 2019/0366211 A1 Dec. 5, 2019

(30) Foreign Application Priority Data
Jun. 5, 2018 (JP) .............................. JP2018-107472

(51) Int. Cl.
*A63F 13/00* (2014.01)
*A63F 13/525* (2014.01)
(Continued)

(52) U.S. Cl.
CPC .......... *A63F 13/525* (2014.09); *A63F 13/211* (2014.09); *A63F 13/235* (2014.09);
(Continued)

(58) Field of Classification Search
CPC .... A63F 13/5255; A63F 13/211; A63F 13/92; A63F 13/26; A63F 13/42; A63F 13/426;
(Continued)

(56) References Cited

U.S. PATENT DOCUMENTS

| 6,764,402 | B2 * | 7/2004 | Tajiri | ...................... | A63F 13/34 |
| | | | | | 463/43 |
| 2002/0165028 | A1 * | 11/2002 | Miyamoto | .............. | A63F 13/06 |
| | | | | | 463/46 |

(Continued)

OTHER PUBLICATIONS

"Wii Party U", [online], Nintendo Co., Ltd., http://wiipartyu.nintendo.com/pick-your-party/#gamepad-party), searched May 18, 2018—printed Apr. 12, 2019, 4 pages.

*Primary Examiner* — Justin L Myhr
(74) *Attorney, Agent, or Firm* — Nixon & Vanderhye PC

(57) ABSTRACT

Regarding game processing, a case where a screen is closer to vertical than a first reference is set to a first mode, and a case where the screen is closer to horizontal than the reference is set to a second mode. Then, in the first mode, a virtual camera is set to a first line-of-sight direction, and a game image in which an information image is placed in a first direction is generated. In the second mode, the virtual camera is set to be further downward than the first line-of-sight direction, and a game image in which the plurality of information images are placed in different directions is generated.

18 Claims, 18 Drawing Sheets

(51) Int. Cl.
*A63F 13/426* (2014.01)
*A63F 13/25* (2014.01)
*A63F 13/92* (2014.01)
*A63F 13/235* (2014.01)
*A63F 13/98* (2014.01)
*A63F 13/24* (2014.01)
*A63F 13/211* (2014.01)
*A63F 13/26* (2014.01)

(52) U.S. Cl.
CPC .............. *A63F 13/24* (2014.09); *A63F 13/25* (2014.09); *A63F 13/26* (2014.09); *A63F 13/426* (2014.09); *A63F 13/92* (2014.09); *A63F 13/98* (2014.09)

(58) Field of Classification Search
CPC .... A63F 13/5258; A63F 13/10; A63F 13/428; A63F 13/5252; A63F 13/98; A63F 2300/105; A63F 2300/204; A63F 2300/6045; A63F 13/06; A63F 13/235; A63F 13/24; A63F 13/44; A63F 13/525; A63F 13/812; A63F 2300/1006; A63F 2300/301; A63F 13/00; A63F 13/25; A63F 13/323; A63F 13/327; G06F 3/04815; G06F 3/0346; G06F 1/1626; G06F 3/017
See application file for complete search history.

(56) References Cited

U.S. PATENT DOCUMENTS

| | | | |
|---|---|---|---|
| 2003/0216176 A1* | 11/2003 | Shimizu | A63F 13/211 463/31 |
| 2010/0227642 A1* | 9/2010 | Kim | H04M 1/0256 455/556.1 |
| 2011/0190061 A1* | 8/2011 | Takeda | A63F 13/213 463/39 |
| 2012/0229448 A1* | 9/2012 | Matsunaga | A63F 13/06 345/419 |
| 2012/0302345 A1* | 11/2012 | Shikata | A63F 13/426 463/36 |
| 2013/0265217 A1* | 10/2013 | Sakaguchi | G06F 3/0338 345/156 |
| 2016/0224204 A1* | 8/2016 | Kornmann | G06F 3/0485 |
| 2017/0225082 A1* | 8/2017 | Suwa | H04N 21/2187 |
| 2018/0104583 A1* | 4/2018 | Sato | A63F 13/211 |

* cited by examiner

DIRECTION IN WHICH SCREEN IS IN VERTICALLY-PLACED STATE

DIRECTION IN WHICH SCREEN IS IN HORIZONTALLY-PLACED STATE

GAME SYSTEM WITH VIRTUAL CAMERA ADJUSTMENT BASED ON VIDEO OUTPUT CONNECTION STATUS AND SYSTEM ORIENTATION, AND COUNTERPART STORAGE MEDIUM HAVING STORED THEREIN GAME PROGRAM, GAME APPARATUS, AND GAME PROCESSING METHOD

CROSS REFERENCE TO RELATED APPLICATION

The disclosure of Japanese Patent Application No. 2018-107472, filed on Jun. 5, 2018, is incorporated herein by reference.

FIELD

The technology shown here relates to a game system, a storage medium having stored therein a game program, a game apparatus, and a game processing method for performing processing corresponding to an operation using an operation device.

BACKGROUND AND SUMMARY

Conventionally, there is a game system for performing a game where a display device including an operation section is placed, and a plurality of users operate the operation section.

In the game system, however, the manner of placing the display device is limited. Thus, there is room for further improvement in increasing the variety when a game is performed.

Therefore, it is an object of an exemplary embodiment to provide a game system, a storage medium having stored therein a game program, a game apparatus, and a game processing method that are capable of increasing the variety when a game is performed.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

An exemplary configuration of a game system according to the exemplary embodiment is a game system including an information processing apparatus, and a first operation device and a second operation device wirelessly connected to the information processing apparatus. The information processing apparatus includes: a screen on which an image is displayed; an inertial sensor; a video outputter configured to, when an external video device different from the screen is connected to the video outputter, output a video to the external video device; and at least one computer configured to: based on inertial data of the inertial sensor, calculate an orientation of the information processing apparatus; execute game processing by, in a virtual space, controlling a first operation target based on first operation data acquired from the first operation device and controlling a second operation target based on second operation data acquired from the second operation device; regarding the game processing, set to a first mode a case where an external video device is connected to the video outputter or a case where the information processing apparatus is in an orientation in which the screen is closer to vertical than a first reference, and set to a second mode a case where an external video device is not connected to the video outputter, and the information processing apparatus is in an orientation in which the screen is closer to horizontal than the reference; and based on a virtual camera placed in the virtual space, generate a game image including the first operation target and the second operation target and further including, between a first information image indicating first information and a second information image indicating second information, at least the first information image, wherein in the generating of the game image, in the first mode, the virtual camera is set such that a line-of-sight direction of the virtual camera is a first line-of-sight direction, and a game image in which the first information image is placed in a first direction or a game image in which the first information image and the second information image are placed in the same direction is generated, and in the second mode, the virtual camera is set such that the line-of-sight direction of the virtual camera is a second line-of-sight direction that is further downward in the virtual space than the first line-of-sight direction, and a game image in which the plurality of first information images are placed in different directions or a game image in which the first information image and the second information image are placed in different directions is generated.

Based on the above, in accordance with the orientation of an information processing apparatus including a screen, it is possible to perform a game in different play styles and increase the variety when a game is performed. Further, an information image displayed on the screen is displayed in the state where the information image is easy for a user to view in accordance with the orientation of the information processing apparatus. Thus, it is easy for the user to understand the game.

Further, the first operation device and the second operation device may each include a direction inputter. In this case, the first operation data may include first direction input data acquired from the direction inputter of the first operation device. The second operation data may include second direction input data acquired from the direction inputter of the second operation device. In the executing of the game processing, the first operation target may be moved in the virtual space based on the first direction input data, and the second operation target is moved in the virtual space based on the second direction input data. In the executing of the game processing, regarding at least one of the first direction input data and the second direction input data, an association between a direction input to the direction inputter and a direction in the virtual space may be changed between the first mode and the second mode.

Based on the above, in accordance with the orientation of the information processing apparatus include the screen, it is possible to associate a direction input to a direction inputter with an appropriate direction in a virtual space. Thus, also when the orientation of the information processing apparatus is changed, it is easy to perform a user operation.

Further, in the executing of the game processing, in the first mode, in accordance with the fact that the direction inputter of the first operation device is operated in a first direction, the operation may be controlled as an indication indicating a second direction in the virtual space. In the second mode, in accordance with the fact that the direction inputter of the first operation device is operated in the first direction, the operation may be controlled as an indication indicating a third direction opposite to the second direction in the virtual space. In the first mode, in accordance with the fact that the direction inputter of the second operation device is operated in a fourth direction, the operation may be controlled as an indication indicating a fifth direction in the virtual space. In the second mode, in accordance with the fact that the direction inputter of the second operation device is operated in the fourth direction, the operation may be controlled as an indication indicating the fifth direction in the virtual space.

Based on the above, a mode is changed, whereby it is possible to provide intuitive direction input operations to users viewing the virtual space from opposite directions and users viewing the virtual space from the same direction.

Further, the first information may include a letter and/or a number for a user operating the first operation device. The second information may include a letter and/or a number for a user operating the second operation device.

Based on the above, it is possible to display a letter or a number for informing a user of information in the state where the letter or the number is easy to view.

Further, in the generating of the game image, in the first mode, the virtual camera viewing, from behind one of the first operation target and the second operation target, the operation target may be set, and a game image including the first operation target and the second operation target may be generated.

Based on the above, in a mode where game play is performed in the state where the screen stands, a game image from a viewpoint from behind an operation target is displayed. Thus, it is possible to give a user the realistic feeling of a game.

Further, in the generating of the game image, in the second mode, the virtual camera may be set at a bird's-eye viewpoint, and a game image including the first operation target and the second operation target may be generated.

Based on the above, in a mode where game play is performed in the state where the screen is horizontally placed, a game image from a viewpoint looking down on an operation target is displayed. Thus, it is possible to make a user feel the reality as if the user is performing a board game.

Further, in the executing of the game processing, in the virtual space, game processing for achieving a game where the first operation target flies a virtual object based on the first operation data, and the second operation target hits back the virtual object based on the second operation data may be executed.

Based on the above, it is possible to achieve a game where one of operation targets flies a virtual object, and the other operation target hits back the virtual object.

Further, in the executing of the game processing, in the virtual space, game processing for achieving a game where the first operation target and the second operation target compete against each other while facing each other may be executed.

Based on the above, it is possible to achieve a game where both operation targets compete against each other while facing each other.

Further, the exemplary embodiment may also be carried out in the forms of a storage medium having stored therein a game program, a game apparatus, and a game processing method.

According to the exemplary embodiment, it is possible to perform a game in different play styles in accordance with the orientation of an information processing apparatus including a screen and increase the variety when a game is performed.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

A description is given of a game system according to an exemplary embodiment. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
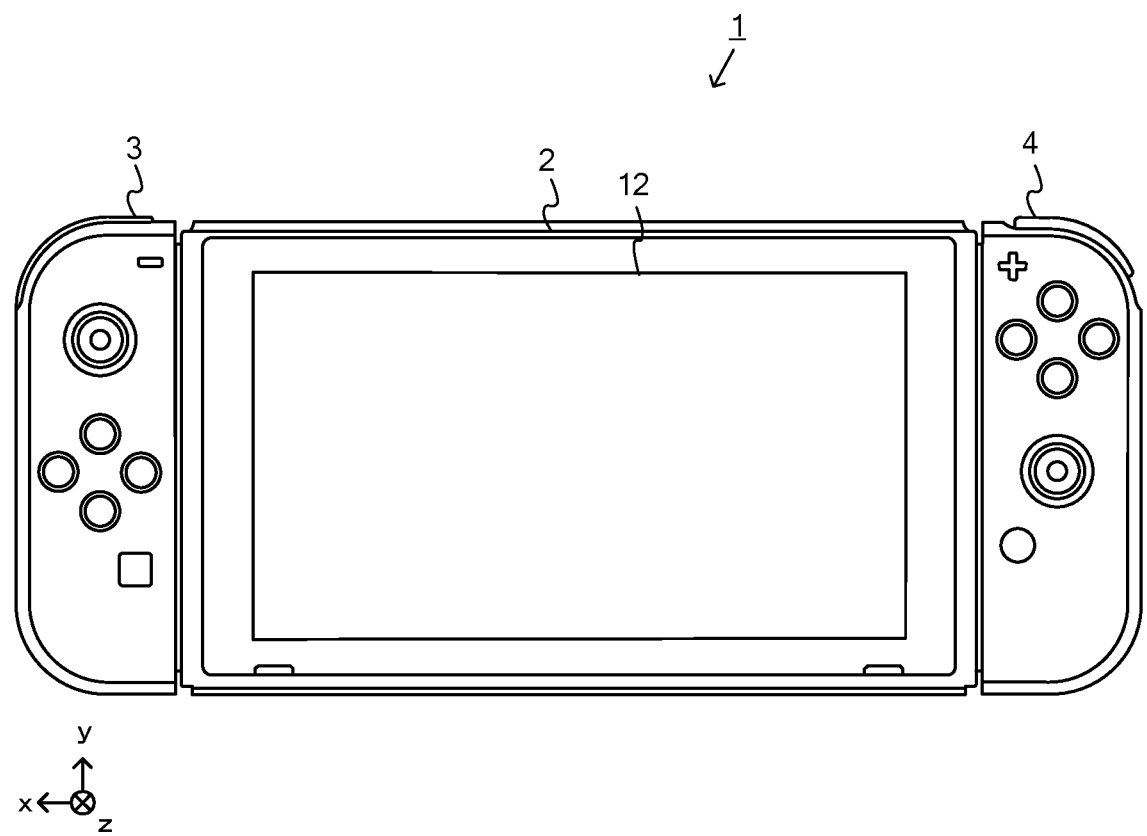
FIG. 1 is a diagram showing a non-limiting example of the state where a left controller 3 and a right controller 4 are attached to a main body apparatus 2 in an example of a game system 1 according to an exemplary embodiment.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
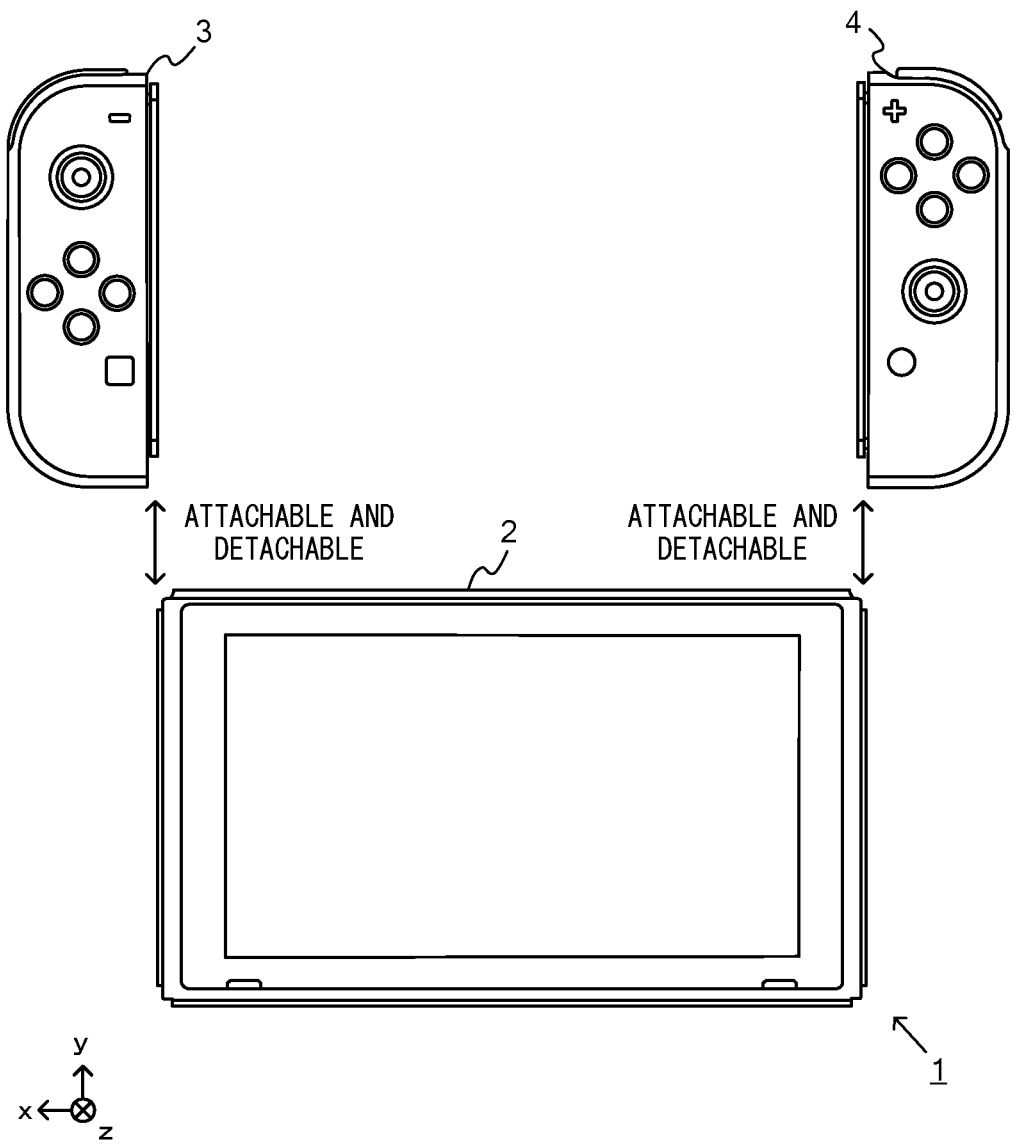
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
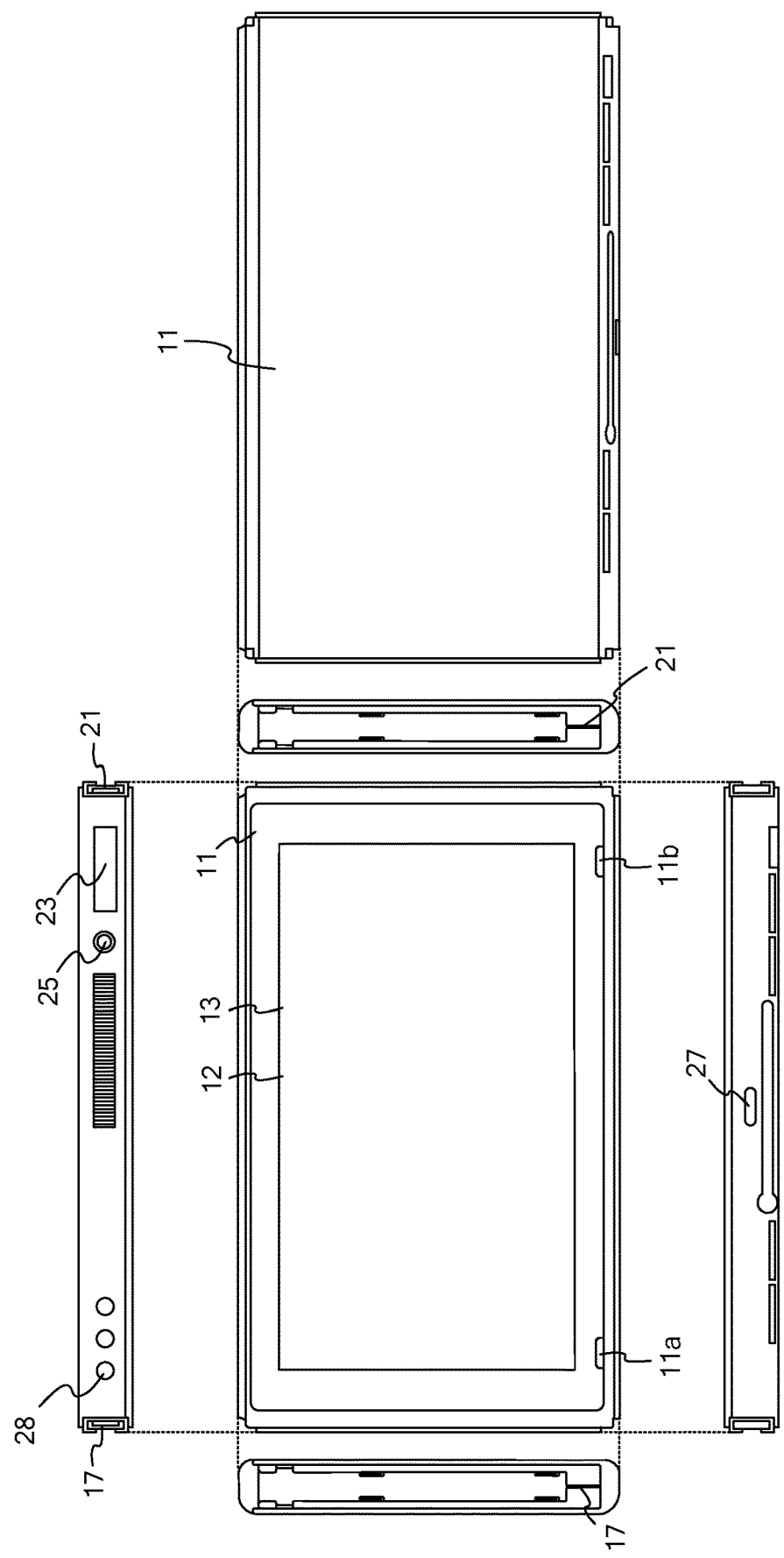
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11*a* and 11*b* are formed on the main surface of the housing 11. Then, sounds output from the speakers 88 are output through the speaker holes 11*a* and 11*b*.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
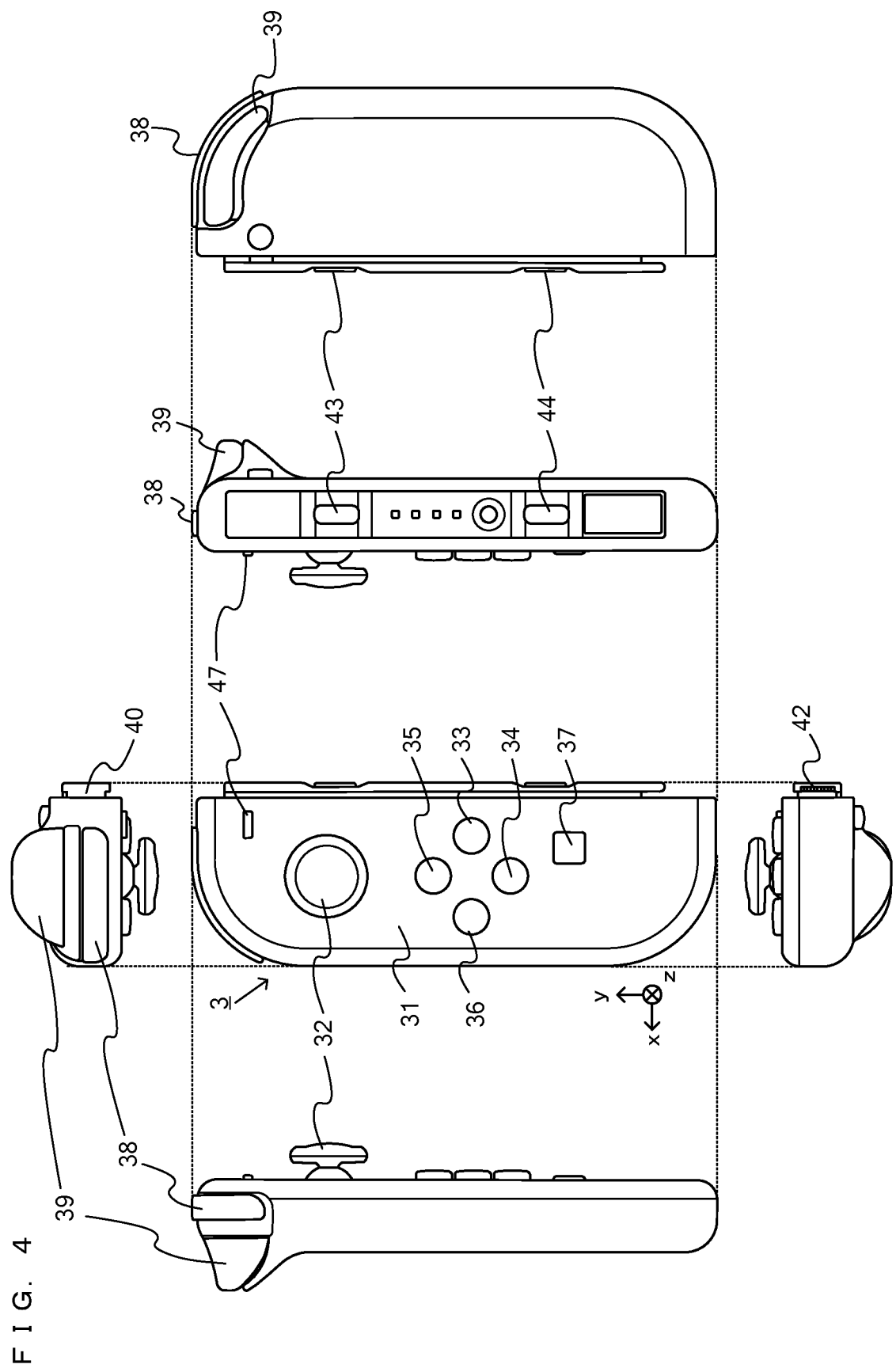
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−"

(minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
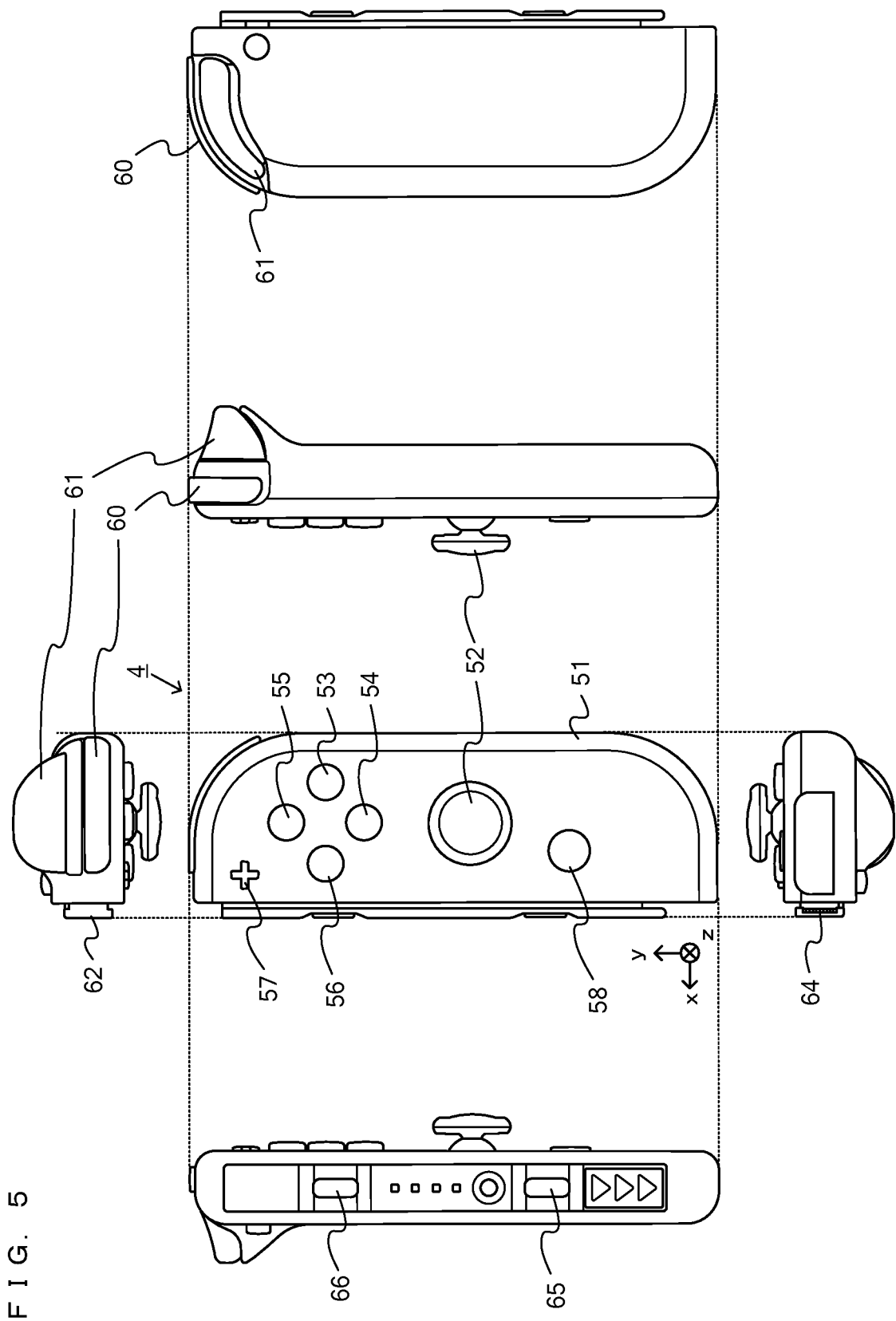
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
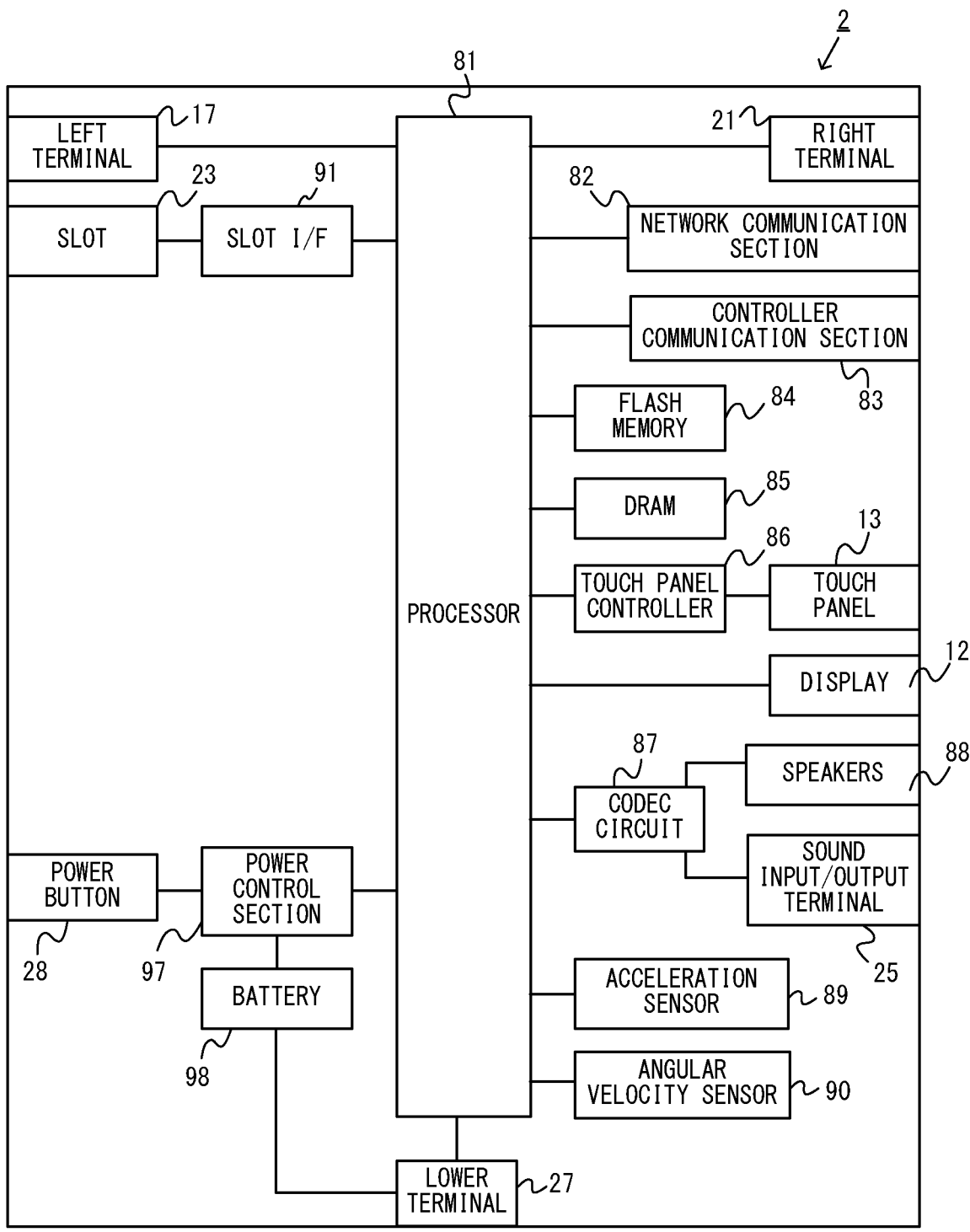
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions. It should be noted that the acceleration sensor 89 corresponds to an example of an inertial sensor included in the information processing apparatus.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes. It should be noted that the angular velocity sensor 90 corresponds to another example of the inertial sensor included in the information processing apparatus.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
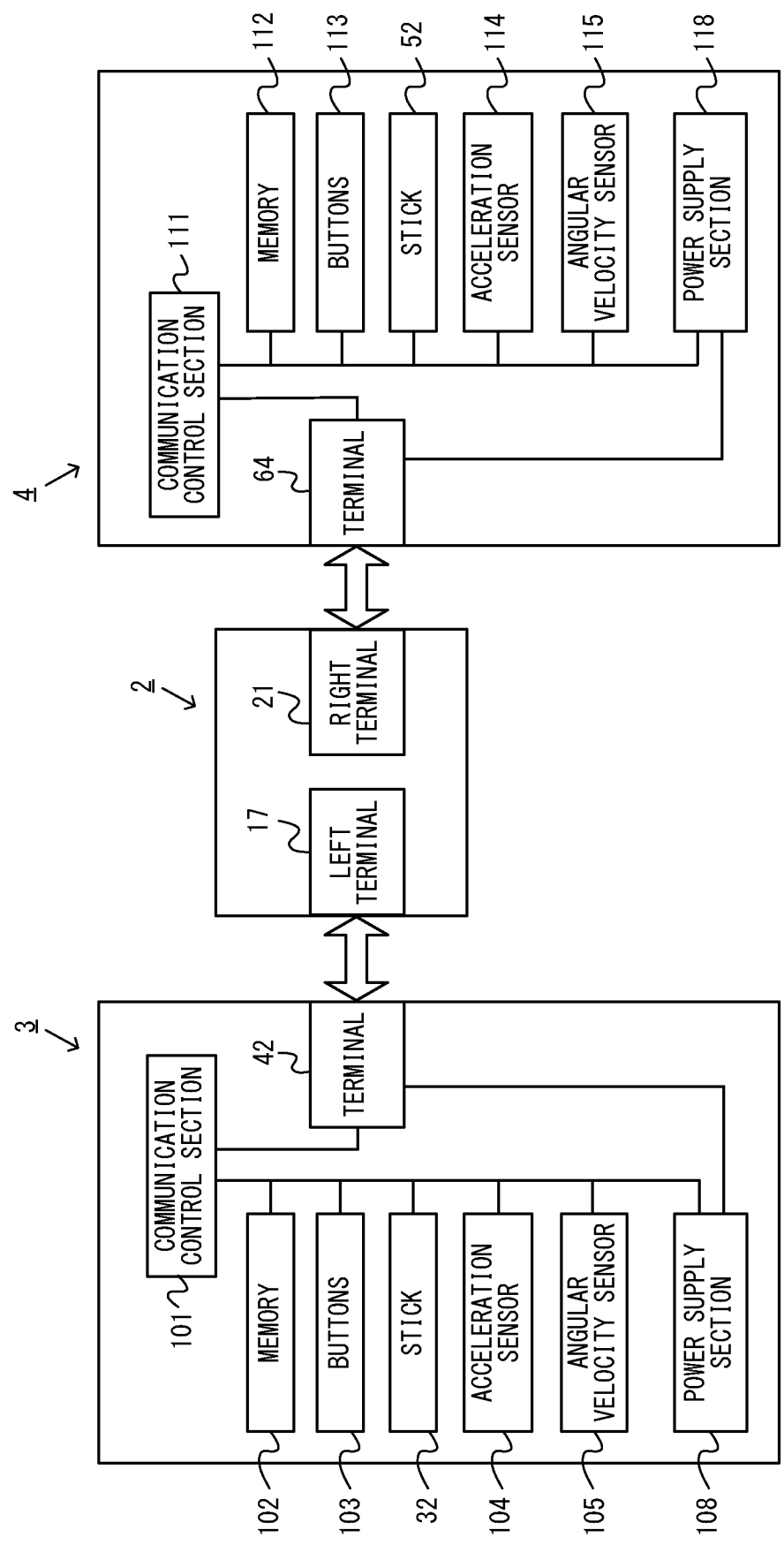
FIG. 7 is a block diagram showing a non-limiting example of the internal configuration of the game system 1.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As describe above, in the game system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle and thereby can output an image (and a sound) to the stationary monitor 6. A description is given below using a game system in a use form in which an image (and a sound) is output from the main body apparatus 2 in the state where the left controller 3 and the right controller 4 are detached from the main body apparatus 2.

As described above, in the exemplary embodiment, the game system 1 can also be used in the state where the left controller 3 and the right controller 4 are detached from the main body apparatus 2 (referred to as a "separate state"). As a form in a case where an operation is performed on an application (e.g., a game application) using the game system 1 in the separate state, a form is possible in which two users each use the left controller 3 and the right controller 4. Further, when three or more users perform operations using the same application, a form is possible in which a plurality of sets of the left controller 3 and the right controller 4 are prepared, and each user uses either one of the left controller 3 and the right controller 4. Further, as another form in which a plurality of users perform operations, a form is possible in which each user uses both the left controller 3 and the right controller 4. In this case, for example, a form is possible in which a plurality of sets of the left controller 3 and the right controller 4 are prepared, and each user uses one of the plurality of sets.

FIGS. 8 to 13 are diagrams showing examples of the state where in the separate state, two users use the game system 1 by each user operating one of the left controller 3 and the right controller 4. As shown in FIGS. 8 to 13, in the separate state, a first user and a second user can view an image displayed on the main body apparatus 2 while performing operations by the first user holding the left controller 3 with their both hands, and the second user holding the right controller 4 with their both hands.

For example, in the exemplary embodiment, the first user holds the left controller 3 with their both hands such that the longitudinal direction of the left controller 3 (a down direction shown in FIG. 1 (a negative y-axis direction)), which is vertically long and approximately plate-shaped, is a transverse direction and a horizontal direction, and a side surface of the left controller 3 that is in contact with the main body apparatus 2 when the left controller 3 is attached to the main body apparatus 2 (a side surface on which a slider 40 is provided) is directed forward, and also the main surface of the left controller 3 (a surface on which the analog stick 32 and the like are provided) is directed upward. That is, the left controller 3 held with both hands of the first user is in the state where a negative x-axis direction is directed in the forward direction of the user, and a positive z-axis direction is directed upward. Further, the second user holds the right controller 4 with their both hands such that the longitudinal direction of the right controller 4 (a down direction shown in FIG. 1 (a negative y-axis direction)), which is vertically long and approximately plate-shaped, is a transverse direction and a horizontal direction, and a side surface of the right controller 4 that is in contact with the main body apparatus 2 when the right controller 4 is attached to the main body apparatus 2 (a side surface on which a slider 62 is provided) is directed forward, and also the main surface of the right controller 4 (a surface on which the analog stick 52 and the like are provided) is directed upward. That is, the right controller 4 held with both hands of the second user is in the state where a positive x-axis direction is directed in the forward direction of the user, and a positive z-axis direction is directed upward.

As described above, in accordance with the fact that the operation buttons or the stick of the left controller 3 or the right controller 4 held with both hands are operated, game play is performed. In the state where the left controller 3 or the right controller 4 is held with both hands (hereinafter, such an operation method will occasionally be referred to as a "horizontally-held operation method"), each controller is moved in up, down, left, right, front, and back directions, rotated, or swung, whereby game play can also be performed in accordance with the motion or the orientation of the controller. Then, in the above game play, the acceleration sensor 104 of the left controller 3 can detect accelerations in the xyz-axis directions as operation inputs, and the angular velocity sensor 105 can detect angular velocities about the xyz-axis directions as operation inputs. Further, the acceleration sensor 114 of the right controller 4 can detect accelerations in the xyz-axis directions as operation inputs, and the angular velocity sensor 115 can detect angular velocities about the xyz-axis directions as operation inputs.

Figure 8:
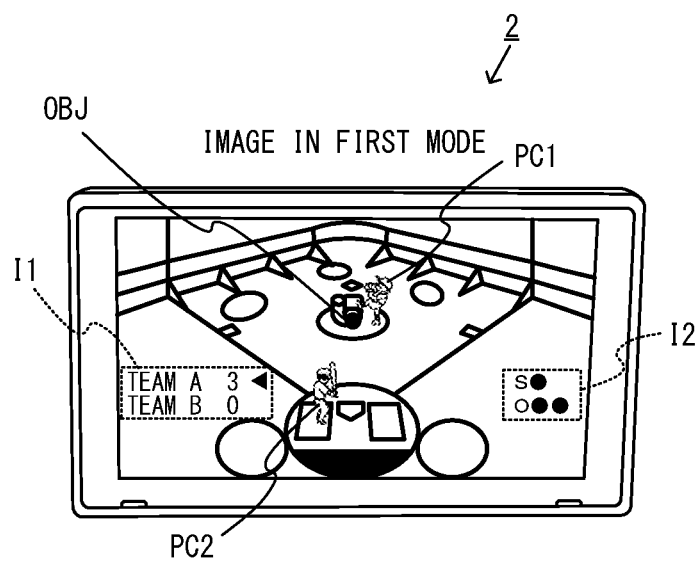
FIG. 8 is a diagram showing a non-limiting example of the state where the game system 1 is used by two users operating the left controller 3 and the right controller 4.
Figure 8:
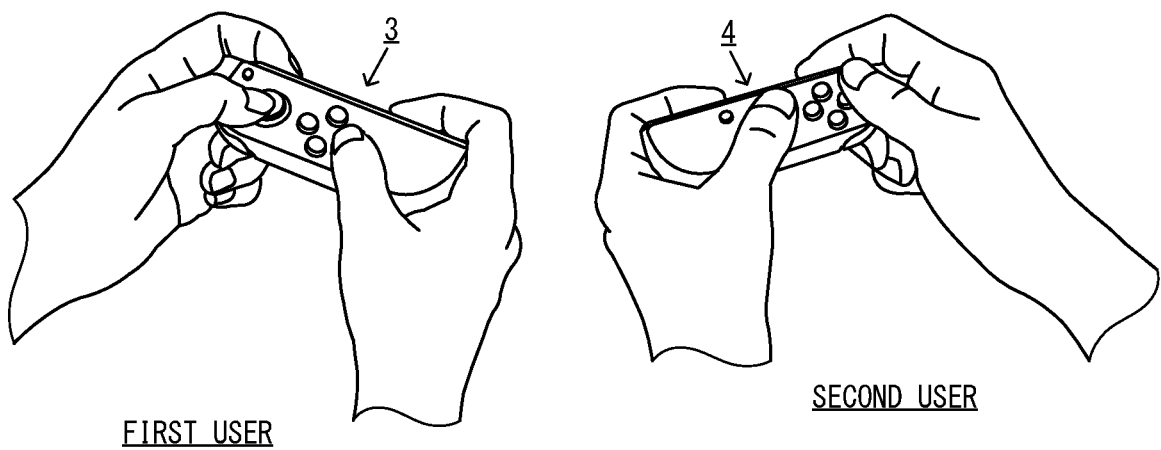
Figure 9:
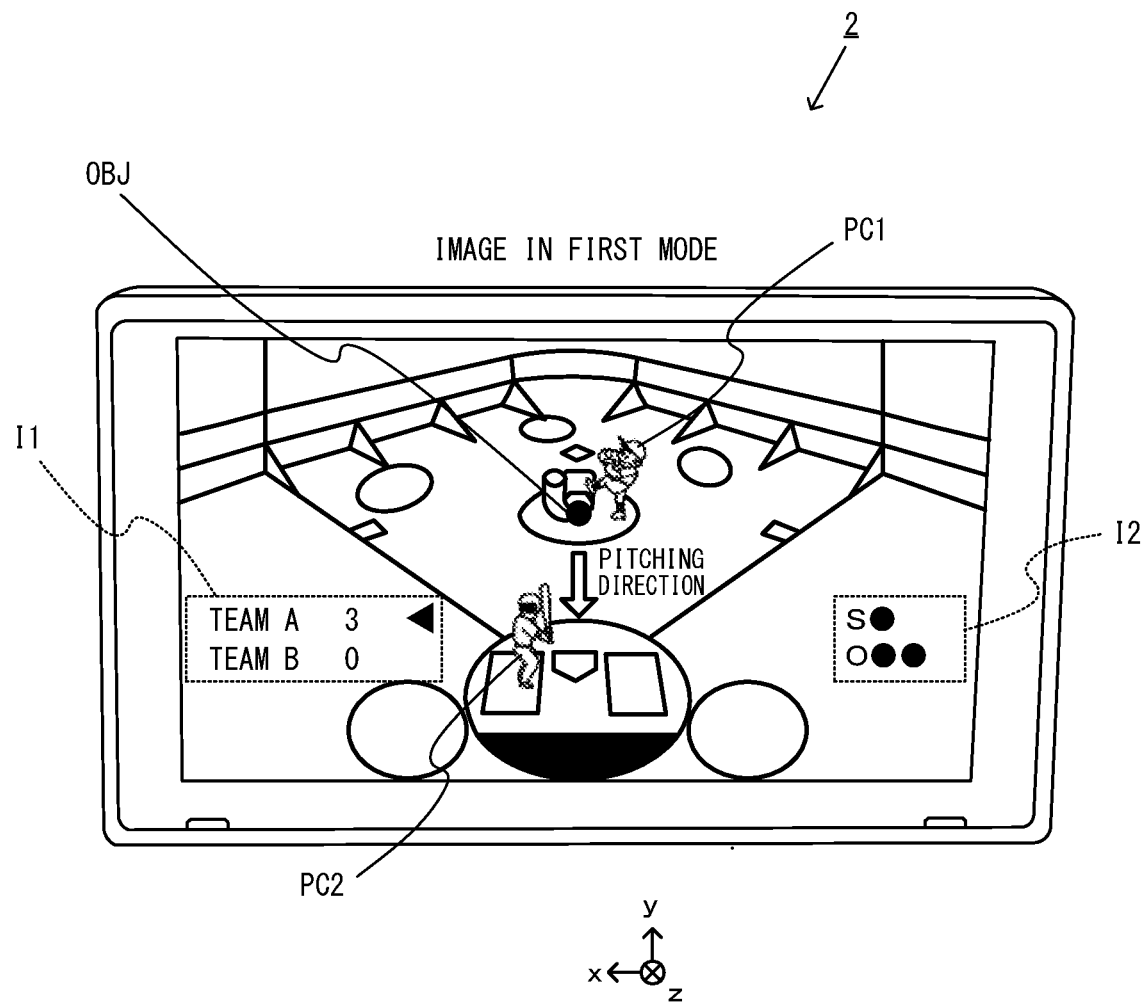
FIG. 9 is a diagram showing a non-limiting example of the state where the game system 1 is used by the two users operating the left controller 3 and the right controller 4.

FIGS. 8 to 13 show examples of game images displayed in a game played by operating the left controller 3 or the right controller 4. As shown in FIGS. 8 and 9, in this exemplary game, an image of a game where a plurality of player characters (a first player character PC1 and a second player character PC2 in the examples of FIGS. 8 and 9) compete against each other (e.g., a board game or a baseball pinball where the team of the first player character PC1 and the team of the second player character PC2 play baseball against each other) is displayed on the main body apparatus 2. Then, the first user operating the left controller 3 can operate the first player character PC1 by operating the analog stick 32 and the operation buttons 33 to 36. Further, the second user operating the right controller 4 can operate the second player character PC2 by operating the analog stick 52 and the operation buttons 53 to 56. Further, the first user and the second user may perform operations by moving the left controller 3 and the right controller 4 themselves. It should be noted that each team may include a non-player character of which the action is automatically controlled by a computer (the processor 81 of the main body apparatus 2). It should be noted that the first player character PC1 corresponds to an example of a first operation target, and the second player character PC2 corresponds to an example of a second operation target.

In this exemplary game, a horizontal board is set in a virtual space, and a baseball ground is provided on the board. Then, a player (the first player character PC1 in FIG. 8) belonging to one team that is a defensive team rolls a ball-like virtual object OBJ on the board by performing a pitching action, and a player (the second player character PC2 in FIG. 8) belonging to the other team that is an offensive team hits back the virtual object OBJ with a bat on the board, whereby the game progresses. That is, in this exemplary game, a game where on the board in the virtual space, the first player character PC1 and the second player character PC2 face each other, and the second player character PC2 hits back the virtual object OBJ thrown by the first player character PC1 is performed. It should be noted that the pitching action may be the action of the character throwing a ball. However, since this exemplary game imitates a baseball board game, the pitching action may be, for example, a more board-game-like action in which the character moves a pitching machine on a pinball, thereby discharging a ball.

For example, the first user operating the defensive team performs a pressing operation on the operation buttons 33 to 36 of the left controller 3 or performs a tilt operation on the analog stick 32, and thereby can cause the first player character PC1 to perform the action of throwing the virtual object OBJ by rolling the virtual object OBJ on the board. As an example, after tilting the analog stick 32 in the up or down direction, the first user releases the analog stick 32 and thereby can cause the first player character PC1 to perform the pitching action. Further, the first user tilts the analog stick 32 in the left or right direction and thereby can cause the first player character PC1 to perform the pitching action by, for example, shifting or breaking the virtual object OBJ in the left or right direction as viewed from the first user.

On the other hand, the second user operating the offensive team performs a pressing operation on the operation buttons 53 to 56 of the right controller 4 or performs a tilt operation on the analog stick 52, and thereby can cause the second player character PC2 to perform the action of hitting back the virtual object OBJ on the board. As an example, the second user presses the A-button 53 and thereby can cause the second player character PC2 to hit back with a bat the virtual object OBJ thrown by the first player character PC1.

Here, in the exemplary embodiment, the game in a first mode and the game in a second mode can be performed. For example, in the exemplary embodiment, in a case where the main body apparatus 2 is in the orientation in which the display 12 is closer to vertical than a predetermined reference (the depth direction of the display 12 is close to horizontal) (hereinafter referred to as a "vertically-placed state"), the game is performed in the first mode. Further, in the exemplary embodiment, in a case where the main body apparatus 2 is in the orientation in which the display 12 is closer to horizontal than the predetermined reference (the depth direction of the display 12 is close to vertical) (hereinafter referred to as a "horizontally-placed state"), the game is performed in the second mode. It should be noted that the orientation of the information processing apparatus in which the screen is closer to vertical than a predetermined reference corresponds to, as an example, the vertically-placed state of the main body apparatus 2. Further, the orientation of the information processing apparatus in which the screen is closer to horizontal than the predetermined reference corresponds to, as an example, the horizontally-placed state of the main body apparatus 2.

It should be noted that when an image to be displayed on the display 12 is output to an external device, the first mode may be set. In this case, when the image is output to the external device in the state where the main body apparatus 2 is in the vertically-placed state or the main body apparatus 2 is connected to an external device, the game is performed in the first mode. Further, when the main body apparatus 2 is in the horizontally-placed state, and the main body apparatus 2 is not connected to an external device, and the image is not output to the external device, the game is performed in the second mode. As described above, when the main body apparatus 2 is mounted on the cradle, the game system 1 can display on the stationary monitor an image generated by and output from the main body apparatus 2 and switch the first mode and the second mode based on the presence or absence of a connection between the main body apparatus 2 and the cradle. When the main body apparatus 2 outputs an image to an external device, the external device displays a game image in the first mode. In the following description, however, an example is used where in accordance with the orientation of the main body apparatus 2, a game image is displayed on the display 12 of the main body apparatus 2 by switching the first mode and the second mode. It should be noted that when an external video device different from the display 12 is connected to the main body apparatus 2, a video output section outputs a video to the external video device. The video output section corresponds to, as an example, the lower terminal 27 that is connected to the cradle and outputs an image to an external device.

FIGS. 8 and 9 exemplify examples of operations using the main body apparatus 2 placed in the vertically-placed state, and a game image in the first mode is displayed on the display 12 of the main body apparatus 2. As shown in FIG. 8, in the first mode, it is assumed that at a location near the front of the display 12 of the main body apparatus 2 placed in the vertically-placed state, the first user and the second user perform operations side by side. Then, as shown in FIGS. 8 and 9, in the first mode, a game image including the first player character PC1 and the second player character PC2 is displayed on the main body apparatus 2. Specifically, in the first mode, a virtual camera is placed at the position where the first player character PC1 and the second player character PC2 are viewed from behind the second player character PC2 belonging to the offensive team, and a game image viewed from the virtual camera is displayed on the main body apparatus 2. For example, in the case of a baseball board game (a table baseball game or a baseball pinball), in the first mode, a virtual camera viewing the first player character PC1 as a pitcher and the second player character PC2 as a batter from a backstop direction is set. Consequently, in the first mode, the virtual camera is placed on an extension of the virtual object OBJ thrown by the first player character PC1 or above the extension. Thus, a game image of the line of sight from the second player character PC2 as the batter to the first player character PC1 as the pitcher is displayed. Thus, in the first mode, a game image in which, while opposed to the first player character PC1 throwing the virtual object OBJ from the far side of the game image, the second player character PC2 placed on the near side of the game image hits back the virtual object OBJ is displayed on the main body apparatus 2. As an example, when the main body apparatus 2 is placed such that the negative y-axis direction of the main body apparatus 2 is the vertical direction, the virtual object OBJ thrown by the first player character PC1 from near the center of the display screen is displayed by moving to the near side in a lower direction of the display screen and toward the second player character PC2 (the negative y-axis direction and a pitching direction shown in FIGS. 8 and 9).

Further, as shown in FIGS. 8 and 9, in the game image in the first mode, an information image I is displayed. The information image I indicates information regarding the played game, the player characters, and the like using a letter, a number, a sign, an indicator, and the like. The information image I may inform both the first user and the second user of the information, or may inform one of the first user and the second user of the information. For example, in the examples shown in FIGS. 8 and 9, two information images I1 and I2 indicating the situation of the played game are displayed. Specifically, the information image I1 is an image which informs the first user and the second user of the score situations of both teams using a letter and a number and to which an indicator indicating the currently offensive team is assigned. The information image I2 is an image that informs the first user and the second user of the situation of the current inning (e.g., the number of strikes, the number of outs, and the like) using a letter and a sign. Then, both the information images I1 and I2 are displayed such that the direction from top to bottom of a letter or a number is the down direction of the main body apparatus 2 (the negative y-axis direction, and the pitching direction shown in FIGS. 8 and 9). Thus, the information images I1 and I2 are display that is easy for the first user and the second user performing operations at the location near the front of the display 12 of the main body apparatus 2 to read. It should be noted that a first information image corresponds to, as an example, the information images I1 and I2.

Further, in the first mode, the left direction as viewed from the first user and the second user is the positive x-axis direction of the main body apparatus 2, and the right direction as viewed from the first user and the second user is the negative x-axis direction of the main body apparatus 2. Then, the directions of direction inputs using the left controller 3 and the right controller 4 (e.g., tilt operation inputs using the analog stick 32 and the analog stick 52) are also associated based on these directions. That is, when the first user and the second user provide direction inputs of the left direction using the left controller 3 and the right controller 4 (e.g., inputs of tilting the analog stick 32 and the analog stick 52 to the left), these are direction inputs of the positive x-axis direction of the main body apparatus 2 and are associated with the direction from a first base to a third base in the virtual space (the right direction as viewed from the first player character PC1 placed facing the virtual camera, and the left direction as viewed from the second player character PC2 placed with its back against the virtual camera). When the first user wishes to pitch the virtual object OBJ from the right as viewed from the first user, the first user provides a direction input of the right direction using the left controller 3 (e.g., an input of tilting the analog stick 32 to the right). Consequently, a movement start position of the virtual object OBJ moves in the left direction as viewed from the first player character PC1. Further, when the first user wishes to pitch the virtual object OBJ from the left as viewed from the first user, the first user provides a direction input of the left direction using the left controller 3 (e.g., an input of tilting the analog stick 32 to the left). Consequently, the movement start position of the virtual object OBJ moves in the right direction as viewed from the first player character PC1. In the case of a full-fledged baseball game, not a baseball board game, when the first user wishes to break the virtual object OBJ thrown by the first player character PC1 to the right as viewed from the first user, the first user provides a direction input of the right direction using the left controller 3 (e.g., an input of tilting the analog stick 32 to the right). Consequently, the virtual object OBJ moves along the trajectory in which the virtual object OBJ breaks in the left direction as viewed from the first player character PC1 that is right-handed (a curveball or a slider). Further, when the first user wishes to break the virtual object OBJ thrown by the first player character PC1 to the left as viewed from the first user, the first user provides a direction input of the left direction using the left controller 3 (e.g., an input of tilting the analog stick 32 to the left). Consequently, the virtual object OBJ moves along the trajectory in which the virtual object OBJ breaks in the right direction as viewed from the first player character PC1 that is right-handed (a shootball or a screwball).

Figure 10:
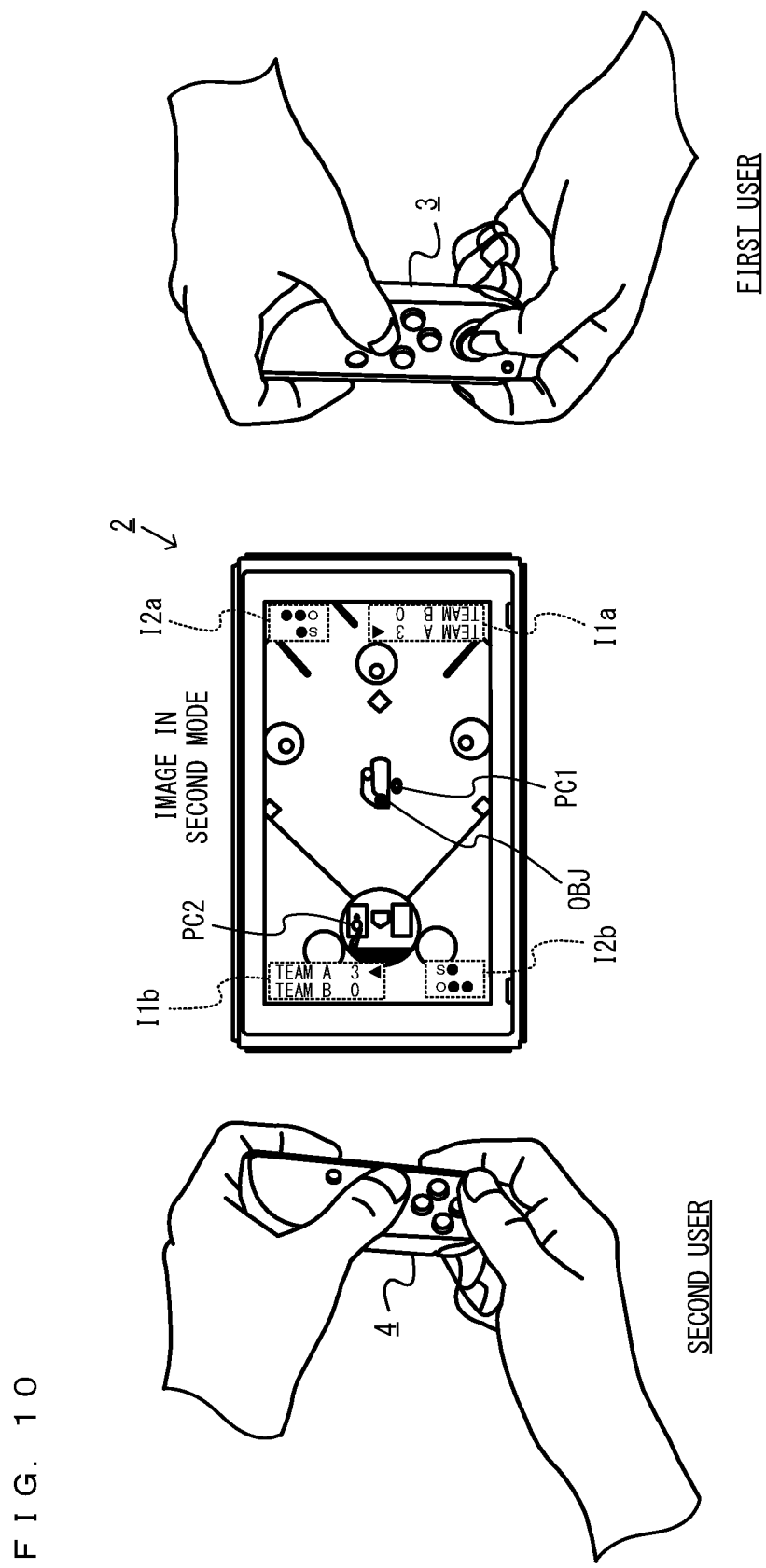
FIG. 10 is a diagram showing a non-limiting example of the state where the game system 1 is used by the two users operating the left controller 3 and the right controller 4.
Figure 11:
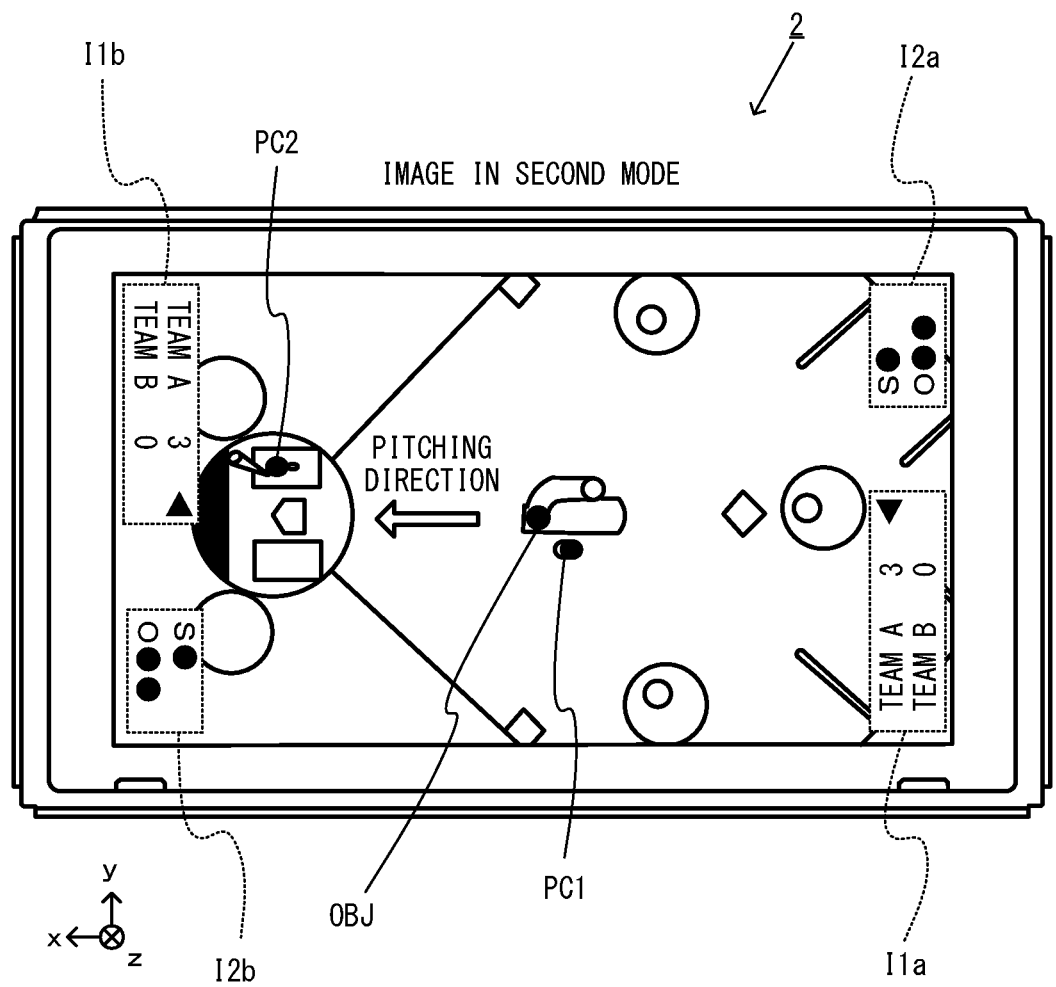
FIG. 11 is a diagram showing a non-limiting example of the state where the game system 1 is used by the two users operating the left controller 3 and the right controller 4.

FIGS. 10 and 11 exemplify examples of operations using the main body apparatus 2 placed in the horizontally-placed state, and a game image in the second mode is displayed on the display 12 of the main body apparatus 2. As shown in FIG. 10, in the second mode, it is assumed that the first user performs an operation on the right side (further in the negative x-axis direction) of the display 12 of the main body apparatus 2 placed in the horizontally-placed state, the second user performs an operation on the left side (further in the positive x-axis direction), and the first user and the second user perform operations facing each other across the main body apparatus 2. Then, as shown in FIGS. 10 and 11, also in the second mode, a game image including the first player character PC1 and the second player character PC2 is displayed on the main body apparatus 2.

In the second mode, a virtual camera is placed such that the line-of-sight direction of the virtual camera is further downward in the virtual space than the line-of-sight direction set in the first mode. Specifically, in the second mode, a virtual camera is placed at a viewpoint looking down on the first player character PC1 and the second player character PC2 (e.g., a bird's-eye viewpoint or an overhead viewpoint), and a game image viewed from the virtual camera is displayed on the main body apparatus 2. For example, in the case of a baseball board game (a table baseball game), in the second mode, a virtual camera looking down on the first player character PC1 as a pitcher and the second player character PC2 as a batter with the entirety of a ballpark as a field of view is set. Consequently, in the second mode, a game image in which a virtual camera is placed over the head of the first player character PC1 or the second player character PC2 is displayed. Thus, in the second mode, a game image in which, while opposed to the first player character PC1 throwing the virtual object OBJ from near the center of the game image, the second player character PC2 placed near one end (e.g., near the end in the positive x-axis direction) of the game image hits back the virtual object OBJ is displayed on the main body apparatus 2. As an example, the virtual object OBJ thrown by the first player character PC1 from near the center of the display screen is displayed by moving parallel to the display screen to the left of the display screen and toward the second player character PC2 (the positive x-axis direction and the pitching direction shown in FIGS. 8 and 9).

Further, as shown in FIGS. 10 and 11, also in the game image in the second mode, the information image I is displayed. The information image I indicates information regarding the played game, the player characters, and the like using a letter, a number, a sign, an indicator, and the like. Similarly to the first mode, the information image I displayed in the second mode may inform both the first user and the second user of the information, or may inform one of the first user and the second user of the information. For example, in the examples shown in FIGS. 10 and 11, sets of information images I1 and I2 indicating the situation of the played game are displayed on the side where the first user plays and the side where the second user plays. Specifically, in the second mode, one set including an information image I1a and an information image I2a indicating the situation of the played game is displayed in one end portion of the display screen that is on the side where the first user plays (e.g., further in the negative x-axis direction of the main body apparatus 2). Further, the other set including an information image I1b, which is the same image as the information image I1a, and an information image I2b, which is the same image as the information image I2a, is displayed in the other end portion of the display screen that is on the side where the second user plays (e.g., further in the positive x-axis direction of the main body apparatus 2). Specifically, similarly to the first mode, the information images I1a and I1b are images which inform the first user and the second user of the score situations of both teams using a letter and a number and to which an indicator indicating the currently offensive team is assigned. Then, the information images I2a and I2b are images that inform the first user and the second user of the situation of the current inning (e.g., the number of strikes, the number of outs, and the like) using a letter and a sign.

Here, in the second mode, the information images I1a and I1b are placed in different directions in the respective end portions of the display screen. More specifically, the information image I1a is displayed in a right end portion of the display screen such that the direction from top to bottom of a letter or a number is the right direction of the main body apparatus 2 (the negative x-axis direction, and a direction opposite to the pitching direction shown in FIGS. 10 and 11). Thus, the information image I1a is display that is easy for the first user performing an operation from the right side of the main body apparatus 2 in the horizontally-placed state to read. Further, the information image I1b is displayed in a left end portion of the display screen such that the direction from top to bottom of a letter or a number is the left direction of the main body apparatus 2 (the positive x-axis direction, and the pitching direction shown in FIGS. 10 and 11). Thus, the information image I1b is display that is easy for the second user performing an operation from the left side of the main body apparatus 2 in the horizontally-placed state to read. Similarly, in the second mode, the information images I2a and I2b are also placed in different directions in the respective end portions of the display screen. More specifically, the information image I2a is displayed in the right end portion of the display screen such that the direction from top to bottom of a letter or a number is the right direction of the main body apparatus 2 (the negative x-axis direction, and the direction opposite to the pitching direction shown in FIGS. 10 and 11). Thus, the information image I2a is display that is easy for the first user performing an operation from the right side of the main body apparatus 2 in the horizontally-placed state to read. Further, the information image I2b is displayed in the left end portion of the display screen such that the direction from top to bottom of a letter or a number is the left direction of the main body apparatus 2 (the positive x-axis direction, and the pitching direction shown in FIGS. 10 and 11). Thus, the information image I2b is display that is easy for the second user performing an operation from the left side of the main body apparatus 2 in the horizontally-placed state to read.

Further, in the second mode, the left direction as viewed from the first user is the negative y-axis direction of the main body apparatus 2, and the right direction as viewed from the first user is a positive y-axis direction of the main body apparatus 2. Then, the direction of a direction input using the left controller 3 by the first user (e.g., a tilt operation input using the analog stick 32) is also associated based on this direction. That is, when the first user provides a direction input of the left direction using the left controller 3 (e.g., an input of tilting the analog stick 32 to the left), a direction input of the negative y-axis direction of the main body apparatus 2 is provided and associated with the direction from the third base to the first base in the virtual space (the left direction as viewed from the first player character PC1, and the right direction as viewed from the second player character PC2 placed facing the first player character PC1). When the first user wishes to pitch the virtual object OBJ from the left as viewed from the first user, the first user provides a direction input of the left direction using the left controller 3 (e.g., an input of tilting the analog stick 32 to the left). Consequently, the movement start position of the virtual object OBJ moves in the left direction as viewed from the first player character PC1. Further, when the first user wishes to pitch the virtual object OBJ from the right as viewed from the first user, the first user provides a direction input of the right direction using the left controller 3 (e.g., an input of tilting the analog stick 32 to the right). Consequently, the movement start position of the virtual object OBJ moves in the right direction as viewed from the first player character PC1. In the case of a full-fledged baseball game, not a baseball board game, when the first user wishes to break the virtual object OBJ thrown by the first player character PC1 to the left as viewed from the first user, the first user provides a direction input of the left direction using the left controller 3 (e.g., an input of tilting the analog stick 32 to the left). Consequently, the virtual object OBJ moves along the trajectory in which the virtual object OBJ breaks in the left direction as viewed from the first player character PC1 that is right-handed (a curveball or a slider). Further, when the first user wishes to break the virtual object OBJ thrown by the first player character PC1 to the right as viewed from the first user, the first user provides a direction input of the right direction using the left controller 3 (e.g., an input of tilting the analog stick 32 to the right). Consequently, the virtual object OBJ moves along the trajectory in which the virtual object OBJ breaks in the right direction as viewed from the first player character PC1 that is right-handed (a shootball or a screwball).

As is clear from the relationship between an operation in the left direction performed by the first user and the virtual space, the association between a left direction input to the direction input section (e.g., the analog stick 32) of the left controller 3 and a direction in the virtual space by the first user differs between the first mode and the second mode. Specifically, in the first mode, the first user provides a direction input of the left direction using the left controller 3, whereby, for example, the virtual object OBJ shifts or breaks in the right direction as viewed from the first player character PC1. In contrast, in the second mode, the first user provides a direction input of the left direction using the left controller 3, whereby, for example, the virtual object OBJ shifts or breaks in the left direction as viewed from the first player character PC1. Thus, opposite directions are associated in the virtual space between the first mode and the second mode.

Further, when the first user provides a direction input of the right direction using the left controller 3 (e.g., an input of tilting the analog stick 32 to the right), a direction input of the positive y-axis direction of the main body apparatus 2 is provided and associated with the direction from the first base to the third base in the virtual space (the right direction as viewed from the first player character PC1, and the left direction as viewed from the second player character PC2 placed facing the first player character PC1). Thus, when the first user wishes to shift or break the virtual object OBJ thrown by the first player character PC1 to the right as viewed from the first user, the first user provides a direction input of the right direction using the left controller 3 (e.g., an input of tilting the analog stick 32 to the right). Consequently, the virtual object OBJ moves along the trajectory in which the virtual object OBJ shifts or breaks in the right direction as viewed from the first player character PC1 that is right-handed (a shootball or a screwball).

As is clear from the relationship between an operation in the right direction performed by the first user and the virtual space, the association between a direction input to the direction input section (e.g., the analog stick 32) of the left controller 3 by the first user and a direction in the virtual space differs between the first mode and the second mode.

Specifically, in the first mode, the first user provides a direction input of the right direction using the left controller 3, whereby, for example, the virtual object OBJ shifts or breaks in the left direction as viewed from the first player character PC1. In contrast, in the second mode, the first user provides a direction input of the right direction using the left controller 3, whereby, for example, the virtual object OBJ shifts or breaks in the right direction as viewed from the first player character PC1. Thus, opposite directions are associated in the virtual space between the first mode and the second mode.

It should be noted that in the above description, an example is used where the association between a direction input to the direction input section (e.g., the analog stick 32) of the left controller 3 by the first user and a direction in the virtual space differs between the first mode and the second mode. In the second mode, however, for the second user performing an operation while facing the first user across the main body apparatus 2, the association may be the same. That is, in the exemplary embodiment, regarding at least one of an operation on the direction input section (e.g., the analog stick 32) of the left controller 3 by the first user and an operation on the direction input section (e.g., the analog stick 52) of the right controller 4 by the second user, the association between a direction input to the direction input section and a direction in the virtual space may be changed between the first mode and the second mode. For example, it is understood that in the above exemplary embodiment, the association between a direction input to the direction input section (e.g., the analog stick 52) of the right controller 4 by the second user and a direction in the virtual space is the same between the first mode and the second mode. Specifically, in the first mode, the second user provides a direction input of the right direction using the right controller 4, whereby a direction in the virtual space in the right direction as viewed from the second player character PC2 is provided. Then, also in the second mode, the second user provides a direction input of the right direction using the right controller 4, whereby a direction in the virtual space in the same right direction as viewed from the second player character PC2 is provided. Thus, regarding the second user, the association is defined in the same direction in the virtual space between the first mode and the second mode.

Further, as an example of the association between a direction input to the above direction input section and a direction in the virtual space, the direction in which the virtual object OBJ shifts or breaks is used. However, it goes without saying that the association is also applicable to a direction in another type of control in the virtual space. For example, the association may be applied to the association between a direction input to the above direction input section and the moving direction or the placement direction of the first player character PC1 or the second player character PC2 in the virtual space.

Figure 12:
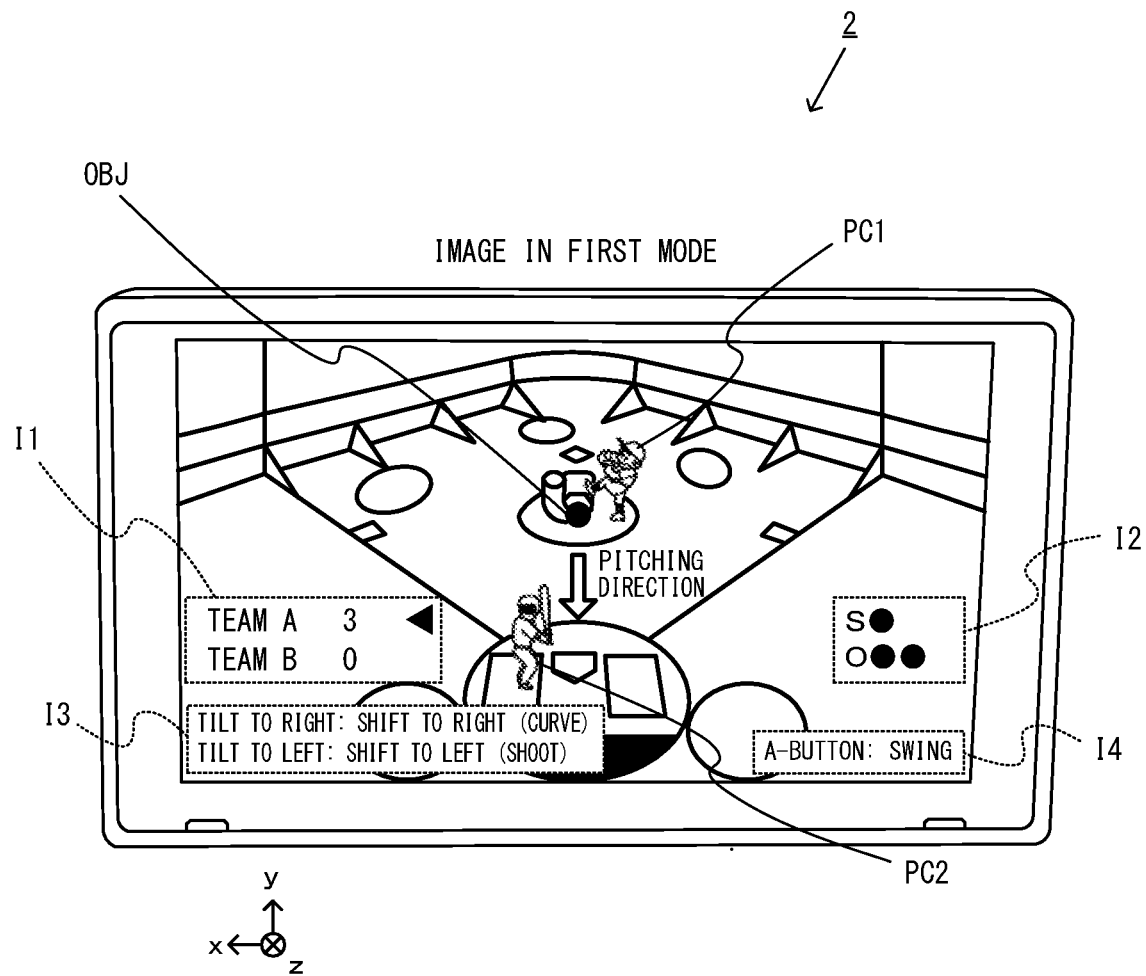
FIG. 12 is a diagram showing a non-limiting example of the state where the game system 1 is used by the two users operating the left controller 3 and the right controller 4.
Figure 13:
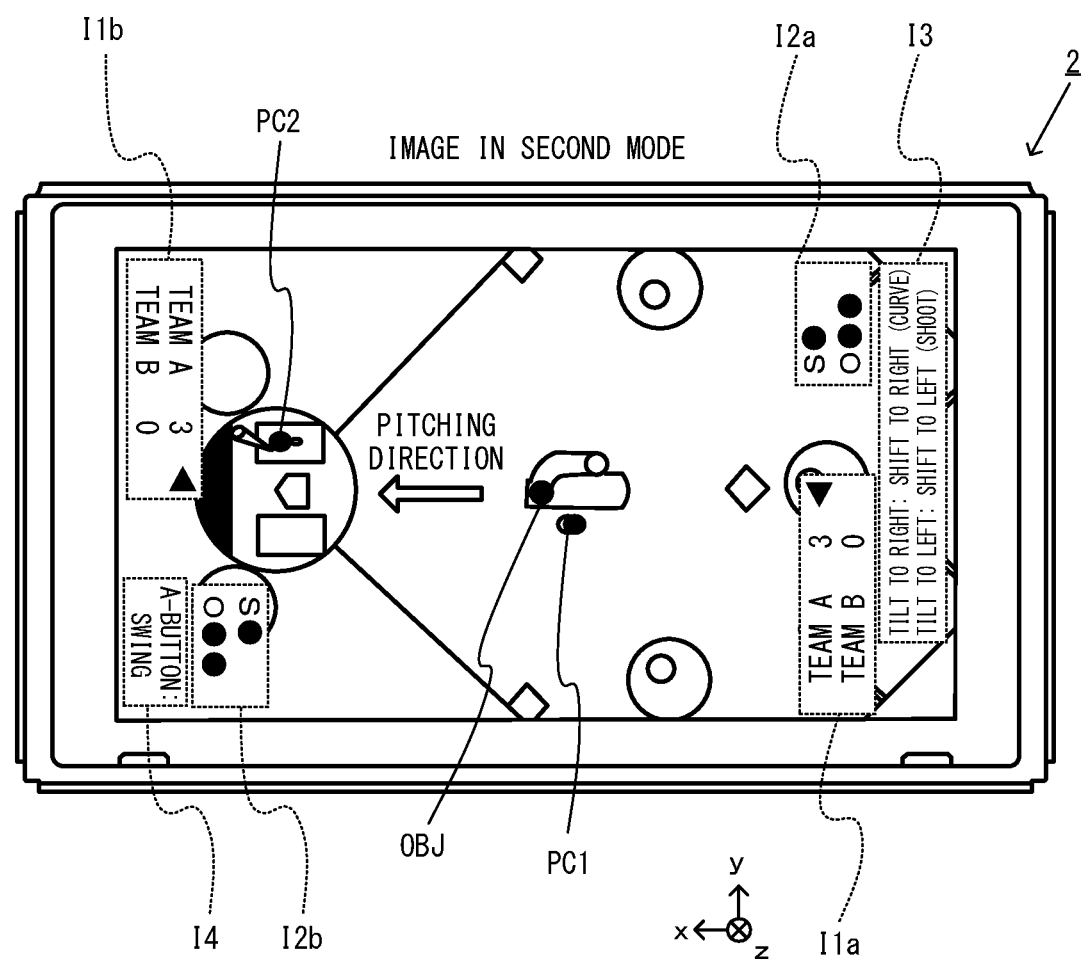
FIG. 13 is a diagram showing a non-limiting example of the state where the game system 1 is used by the two users operating the left controller 3 and the right controller 4.

Further, in the above exemplary embodiment, as an example of the information image I displayed in the first mode and the second mode, the information images I1 and I2 that inform both the first user and the second user of the information are used. Alternatively, the information image I may be displayed in the state where the information image I includes an information image that informs one of the first user and the second user of the information in the first mode and the second mode. Yet alternatively, only an information image that informs one of the first user and the second user of the information may be displayed. With reference to FIGS. 12 and 13, a description is given below of an example where the information image I is displayed in the state where the information image I includes an information image that informs one of the first user and the second user of the information in the first mode and the second mode.

In FIG. 12, in the game image in the first mode, in addition to the above information images I1 and I2, information images I3 and I4 are displayed. Similarly to the information images I1 and I2, also the information images I3 and I4 indicate information regarding the played game, the player characters, and the like using a letter, a number, a sign, an indicator, and the like. It should be noted that a first information image corresponds to the information images I3 as another example. Further, when the first information image corresponds to the information images I3, a second information image corresponds to the information images I4 as an example.

For example, the information images I3 informs the first user of information. Specifically, the information images I3 informs the first user of an operation method when operating the left controller 3. The information images I3 informs the first user that by tilting the analog stick 32 of the left controller 3 to the right, the first player character PC1 can throw a curveball in which the virtual object OBJ shifts or breaks to the right as viewed from the first user (the left as viewed from the first player character PC1). Further, the information images I3 informs the first user that by tilting the analog stick 32 of the left controller 3 to the left, the first player character PC1 operated by the first user can throw a shootball in which the virtual object OBJ shifts or breaks to the left as viewed from the first user (the right as viewed from the first player character PC1).

Further, the information images I4 informs the second user of information. Specifically, the information images I4 informs the second user of an operation method when operating the right controller 4. The information images I4 informs the second user that by performing a pressing operation on the A-button 53 of the right controller 4, the second player character PC2 operated by the second user swings.

In the first mode, similarly to the information images I1 and I2, the information images I3 and I4 are displayed such that the direction from top to bottom of a letter or a number is the down direction of the main body apparatus 2 (the negative y-axis direction, and the pitching direction shown in FIG. 12). Thus, in the first mode, similarly to the information images I1 and I2, the information images I3 is display that is easy for the first user performing an operation at the location near the front of the display 12 of the main body apparatus 2 to read. Further, in the first mode, similarly to the information images I1 and I2, the information images I4 is display that is easy for the second user performing an operation at the location near the front of the display 12 of the main body apparatus 2 to read.

Further, in FIG. 13, also in the game image in the second mode, in addition to the above information images I1 and I2, the information images I3 and I4 are displayed. Similarly to the first mode, the information images I3 displayed in the second mode informs the first user of the information. For example, in the example shown in FIG. 13, in addition to the set of the information images I1a and I2a, the information images I3 is displayed on the side where the first user plays. Specifically, in the second mode, an information image group including the information images I1a and I2a and the information images I3 is displayed in one end portion of the display screen that is on the side where the first user plays (e.g., further in the negative x-axis direction of the main body apparatus 2).

Similarly to the first mode, the information images I4 displayed in the second mode informs the second user of the information. For example, in the example shown in FIG. 13, in addition to the set of the information images I1b and I2b, the information images I4 is displayed on the side where the second user plays. Specifically, in the second mode, an information image group including the information images I1b and I2b and the information images I4 is displayed in the other end portion of the display screen that is on the side where the second user plays (e.g., further in the positive x-axis direction of the main body apparatus 2).

Here, in the second mode, the information images I3 and I4 are placed in different directions in the respective end portions of the display screen. More specifically, the information images I3 is displayed in a right end portion of the display screen such that the direction from top to bottom of a letter or a number is the right direction of the main body apparatus 2 (the negative x-axis direction, and a direction opposite to the pitching direction shown in FIGS. 12 and 13). Thus, the information images I3 is display that is easy for the first user performing an operation from the right side of the main body apparatus 2 in the horizontally-placed state to read. Further, the information images I4 is displayed in a left end portion of the display screen such that the direction from top to bottom of a letter or a number is the left direction of the main body apparatus 2 (the positive x-axis direction, and the pitching direction shown in FIGS. 12 and 13). Thus, the information images I4 is display that is easy for the second user performing an operation from the left side of the main body apparatus 2 in the horizontally-placed state to read.

It should be noted that the above information image I (the information images I1, I2, I3, and I4) may be displayed by being placed in the virtual space, or may be displayed by being combined with a virtual space image. In the first case, in the virtual space where the first player character PC1, the second player character PC2, the virtual object OBJ, and the like are placed, a plate-shaped polygon having a main surface perpendicular to the line-of-sight direction of the virtual camera is placed, and the information image I is pasted to the main surface of the polygon. An image rendered including the information image I is thus generated, whereby it is possible to display on the display 12 a game image in which the information image I is placed. In the second case, the information image I is combined in a superimposed manner with a virtual space image in which the first player character PC1, the second player character PC2, the virtual object OBJ, and the like are rendered, whereby it is possible to display a game image on the display 12.

Further, in the above second mode, when the offense and defense of the player characters switch, i.e., when the first player character PC1 switches from the pitcher to a batter, and the second player character PC2 switches from the batter to a pitcher, as an example, the game may be performed by maintaining the direction of the virtual space displayed on the main body apparatus 2 and rotating by 180 degrees the main body apparatus 2 remaining in the horizontally-placed state. As another example, the game may be performed with the main body apparatus 2 remaining in the same state by displaying the virtual space displayed on the main body apparatus 2 by rotating the front, back, left, and right directions of the virtual space by 180 degrees. In any of the examples, the setting of the association between a direction input to the direction input section of each controller and a direction in the virtual space may be changed in accordance with the placement positions or the directions of the player characters after the offense and defense switch.

Figure 14:
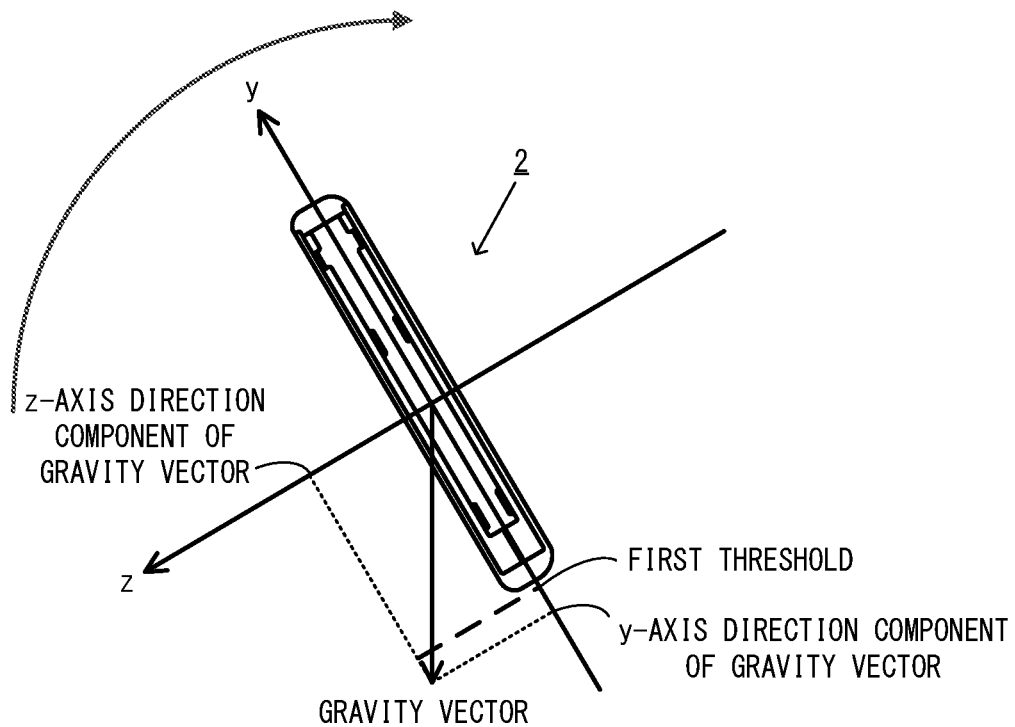
FIG. 14 is a diagram showing a non-limiting example of a state determination method in a case where the orientation of the main body apparatus 2 is changed from a horizontally-placed state to a vertically-placed state.
Figure 15:
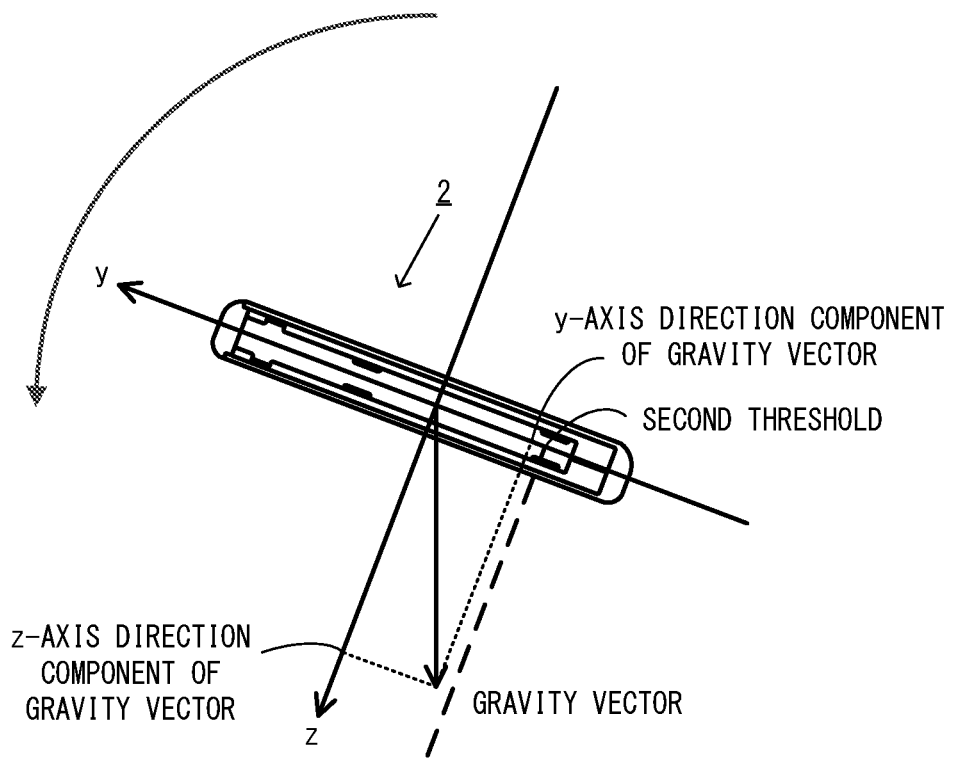
FIG. 15 is a diagram showing a non-limiting example of a state determination method in a case where the orientation of the main body apparatus 2 is changed from the vertically-placed state to the horizontally-placed state.

Next, with reference to FIGS. 14 and 15, a description is given of an example where the first mode or the second mode is set based on the state of the main body apparatus 2. It should be noted that FIG. 14 is a diagram showing an example of a state determination method in a case where the orientation of the main body apparatus 2 is changed from the horizontally-placed state to the vertically-placed state. FIG. 15 is a diagram showing an example of a state determination method in a case where the orientation of the main body apparatus 2 is changed from the vertically-placed state to the horizontally-placed state. Both FIGS. 14 and 15 show the states where the surface of the display 12 of the main body apparatus 2 is directed upward, and show diagrams viewed from the side surface further in the positive x-axis direction (the side surface on the left side in the front view in FIG. 3).

In the exemplary embodiment, using a gravitational acceleration acting on the main body apparatus 2, it is determined whether the main body apparatus 2 is in the horizontally-placed state or the vertically-placed state. Here, as described above, the main body apparatus 2 includes inertial sensors (the acceleration sensor 89 and/or the angular velocity sensor 90). Based on the detection results detected by the inertial sensors (accelerations along the xyz axis directions detected by the acceleration sensor 89 and/or angular velocities about the xyz axes detected by the angular velocity sensor 90), and using any method, the main body apparatus 2 can calculate a gravity vector indicating the gravitational acceleration acting on the main body apparatus 2, and a y-axis direction component and a z-axis direction component of the gravity vector. For example, as shown in FIG. 14, in the exemplary embodiment, the gravity vector acting on the main body apparatus 2 is calculated, and the y-axis direction component and the z-axis direction component of the gravity vector are extracted. Then, in the main body apparatus 2 that is in the horizontally-placed state according to a determination, when the magnitude of the y-axis direction component of the gravity vector changes from less than a first threshold to greater than or equal to the first threshold, it is determined that the main body apparatus 2 changes from the horizontally-placed state to the vertically-placed state. It should be noted that as described above as an example, the determination of whether the main body apparatus 2 is in the horizontally-placed state or the vertically-placed state may be made based on the magnitude of the y-axis direction component of the gravity vector, i.e., the absolute value of the y-axis direction component. As another example, it is possible to determine, including the positivity and negativity of the value of the y-axis direction component of the gravity vector, that the main body apparatus 2 changes from the horizontally-placed state to the vertically-placed state. As shown in FIG. 14, in a case where the positive y-axis direction is an up direction when the main body apparatus 2 is in the vertically-placed state, the y-axis direction component of the gravity vector has a negative value. Thus, when the value of the y-axis direction component of the gravity vector changes to less than or equal to the first threshold, it is determined that the main body apparatus 2 changes from the horizontally-placed state to the vertically-placed state.

Further, as shown in FIG. 15, in the main body apparatus 2 that is in the vertically-placed state according to a determination, when the magnitude of the y-axis direction component of the gravity vector changes from greater than a second threshold to less than or equal to the second threshold, it is determined that the main body apparatus 2 changes from the vertically-placed state to the horizontally-placed state. It should be noted that based on another example described above, also when it is determined, including the positivity and negativity of the value of the y-axis direction component of the gravity vector, that the main body apparatus 2 changes from the vertically-placed state to the horizontally-placed state, the y-axis direction component of the gravity vector has a negative value. Thus, when the value of the y-axis direction component of the gravity vector changes to greater than or equal to the second threshold, it is determined that the main body apparatus 2 changes from the vertically-placed state to the horizontally-placed state.

It should be noted that the magnitude (the absolute value) of the first threshold may be set to be greater than the magnitude (the absolute value) of the second threshold. When the magnitude (the absolute value) of the first threshold and the magnitude (the absolute value) of the second threshold are set to be the same, and the determination is made using a single threshold, then in the state where the y-axis direction component of the gravity vector transitions near the threshold, it is possible that the vertically-placed state and the horizontally-placed state frequently switch. In response, the magnitude (the absolute value) of the first threshold is set to be greater than the magnitude (the absolute value) of the second threshold, whereby, after it is determined once based on one of the thresholds that the main body apparatus 2 is in one of the states, the determination switches to a determination based on the other threshold. Thus, it is possible to prevent the determination that the vertically-placed state and the horizontally-placed state frequently switch.

Further, it is possible that in accordance with the assumed play style, some latitude is allowed in the range where it is determined that the main body apparatus 2 is in the vertically-placed state, or the range where it is determined that the main body apparatus 2 is in the horizontally-placed state. As an example, it is possible that when a stand on which the main body apparatus 2 is placed in the vertically-placed state is prepared, and if the main body apparatus 2 is brought into the vertically-placed state using the stand, the display 12 is inclined by a predetermined angle from vertical. In such a case, the range where it is determined that the main body apparatus 2 is in the vertically-placed state may be set such that the inclination due to the use of the stand is allowed. As another example, when the main body apparatus 2 is placed in the horizontally-placed state, it is possible that the main body apparatus 2 is placed on a table. The top of some table, however, may be inclined from horizontal. Thus, it is possible that if the main body apparatus 2 is placed in the horizontally-placed state in such an inclined top, the display 12 is also inclined from horizontal. In such a case, the range where it is determined that the main body apparatus 2 is in the horizontally-placed state may be set such that the inclination of the top is allowed.

Further, the vertically-placed state and the horizontally-placed state of the main body apparatus 2 described above may be determined using another method. For example, it is also possible that a threshold is set based on the angle of the display 12 to the vertical direction, and the orientation of the main body apparatus 2 calculated based on angular velocities about the xyz axes detected by the angular velocity sensor 90 is determined using the threshold, thereby determining the state of the main body apparatus 2. Further, also as a method for calculating the gravity vector, the gravity vector may be calculated using any method. As an example, after a gravitational acceleration acting on the main body apparatus 2 is detected based on accelerations along the xyz axis directions detected by the acceleration sensor 89, the direction of the gravitational acceleration relative to the main body apparatus 2 may be sequentially calculated using angular velocities about the xyz axes detected by the angular velocity sensor 90. As another example, for example, acceleration components generated on average in the main body apparatus 2 may be sequentially calculated using accelerations along the xyz axis directions detected by the acceleration sensor 89, and the acceleration components may be extracted as a gravitational acceleration.

Figure 16:
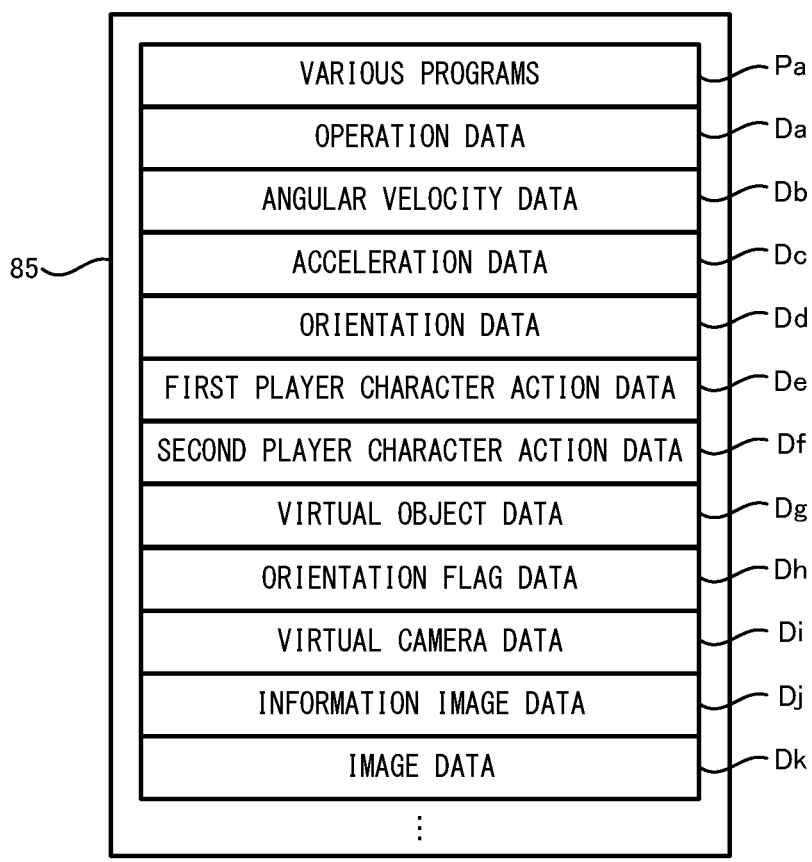
FIG. 16 is a diagram showing a non-limiting example of a data area set in a DRAM 85 of the main body apparatus 2.

Next, with reference to FIGS. 16 to 19, a description is given of an example of specific processing executed by the game system 1 according to the exemplary embodiment. FIG. 16 is a diagram showing an example of a data area set in the DRAM 85 of the main body apparatus 2 according to the exemplary embodiment. It should be noted that in the DRAM 85, in addition to data shown in FIG. 16, data used for other processes is also stored, but is not described in detail here.

In a program storage area of the DRAM 85, various programs Pa, which are executed by the game system 1, are stored. In the exemplary embodiment, as the various programs Pa, a communication program for wirelessly communicating with the left controller 3 and the right controller 4, an application program for performing information processing (e.g., game processing) based on data acquired from the left controller 3 and/or the right controller 4, and the like are stored. It should be noted that the various programs Pa may be stored in advance in the flash memory 84, or may be acquired from a storage medium attachable to and detachable from the game system 1 (e.g., a predetermined type of a storage medium attached to the slot 23) and stored in the DRAM 85, or may be acquired from another apparatus via a network such as the Internet and stored in the DRAM 85. The processor 81 executes the various programs Pa stored in the DRAM 85.

Further, in a data storage area of the DRAM 85, various data used for processes such as a communication process and information processing executed by the game system 1 is stored. In the exemplary embodiment, in the DRAM 85, operation data Da, angular velocity data Db, acceleration data Dc, orientation data Dd, first player character action data De, second player character action data Df, virtual object data Dg, orientation flag data Dh, virtual camera data Di, information image data Dj, image data Dk, and the like are stored.

The operation data Da is operation data appropriately acquired from each of the left controller 3 and/or the right controller 4. As described above, operation data transmitted from each of the left controller 3 and/or the right controller 4 includes information regarding an input (specifically, information regarding an operation or the detection result of each sensor) from each of the input sections (specifically, each button, each analog stick, and each sensor). In the exemplary embodiment, operation data is transmitted in a predetermined cycle from each of the left controller 3 and/or the right controller 4 through wireless communication, and the operation data Da is appropriately updated using the received operation data. It should be noted that the update cycle of the operation data Da may be such that the operation data Da is updated every frame, which is the cycle of the processing described later executed by the main body apparatus 2, or is updated every cycle in which the above operation data is transmitted through the wireless communication.

The angular velocity data Db is data indicating angular velocities generated in the main body apparatus 2. For example, the angular velocity data Db includes data indicating angular velocities about the xyz axes generated in the main body apparatus 2, and the like.

The acceleration data Dc is data indicating accelerations generated in the main body apparatus 2. For example, the acceleration data Dc includes data indicating accelerations in the xyz axis directions generated in the main body apparatus 2, and the like.

The orientation data Dd is data indicating the orientation of the main body apparatus 2 in real space. As an example, the orientation data Dd is data regarding a gravitational acceleration generated in the main body apparatus 2 and is data indicating the magnitude or the value of a y-axis direction component of a gravity vector indicating the gravitational acceleration generated in the main body apparatus 2.

The first player character action data De is data indicating the position, the direction, the orientation, the action, and the like of the first player character PC1 in the virtual space. The second player character action data Df is data indicating the position, the direction, the orientation, the action, and the like of the second player character PC2 in the virtual space. The virtual object data Dg is data indicating the position, the moving direction, and the like of the virtual object OBJ in the virtual space.

The orientation flag data Dh is data indicating an orientation flag indicating whether the main body apparatus 2 is in the vertically-placed state or the horizontally-placed state. The orientation flag is set to on when the main body apparatus 2 is in the vertically-placed state, and is set to off when the main body apparatus 2 is in the horizontally-placed state.

The virtual camera data Di is data indicating the position and the direction of the virtual camera in the virtual space set in accordance with whether the first mode or the second mode is set.

The information image data Dj is data indicating the content of the information image I displayed on the display screen (e.g., the display 12 of the main body apparatus 2).

The image data Dk is data for displaying images (e.g., an image of a player character, an image of a virtual object, an information image, a field image, a background image, and the like) on the display screen (e.g., the display 12 of the main body apparatus 2) when a game is performed.

Figure 17:
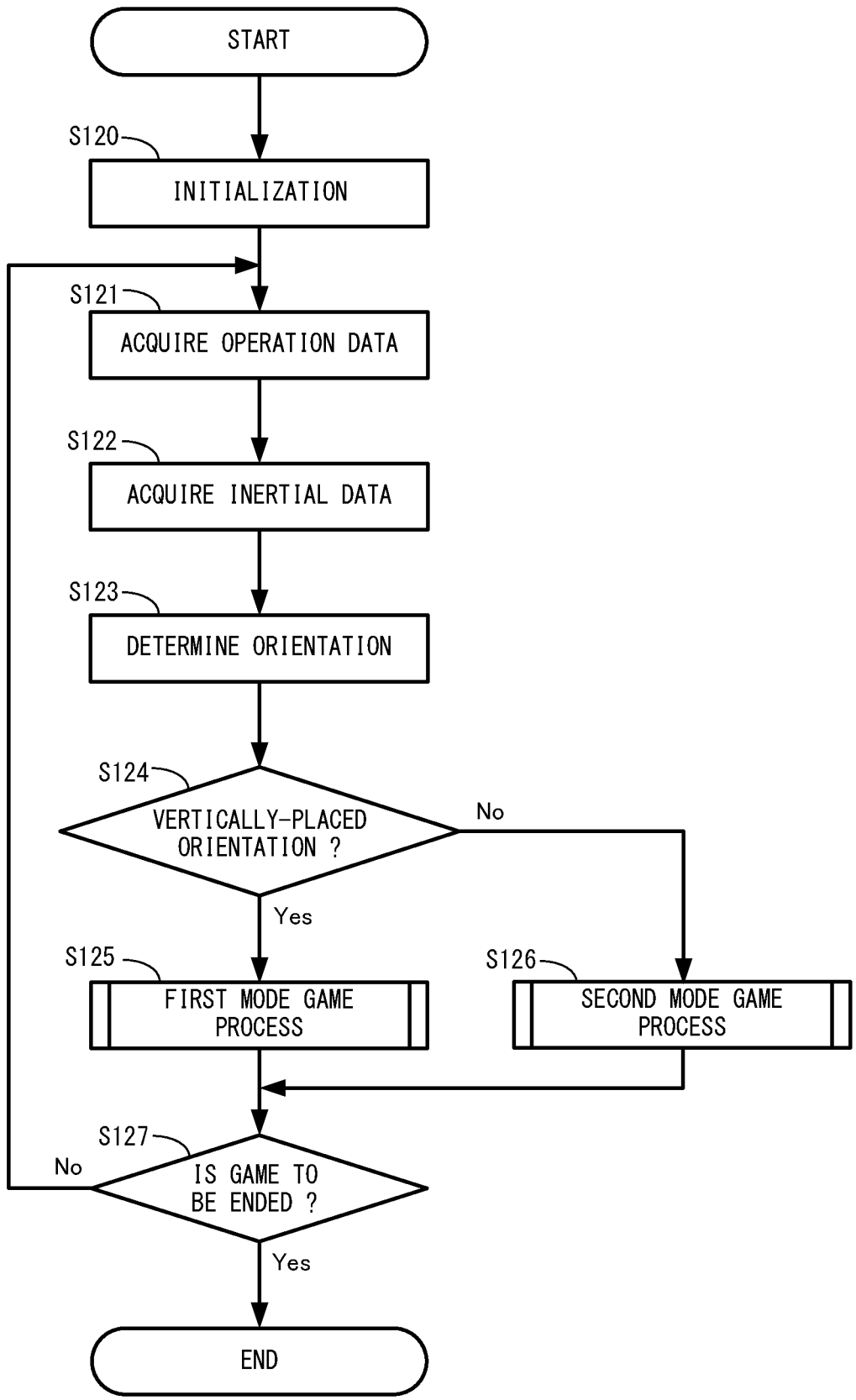
FIG. 17 is a flow chart showing a non-limiting example of game processing executed by the game system 1.
Figure 18:
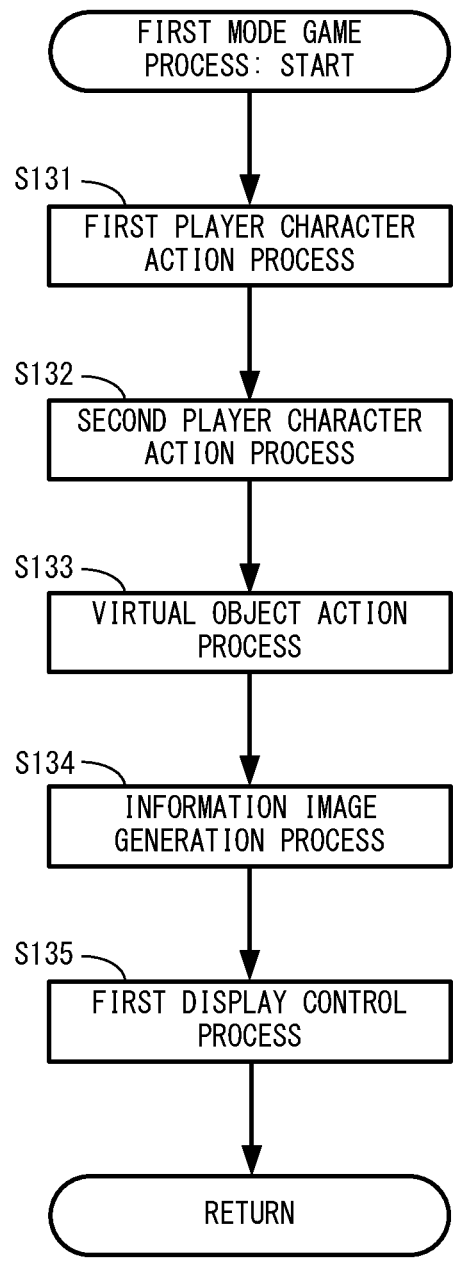
FIG. 18 is a subroutine showing a non-limiting detailed example of a first mode game process performed in step S125 in FIG. 17.
Figure 19:
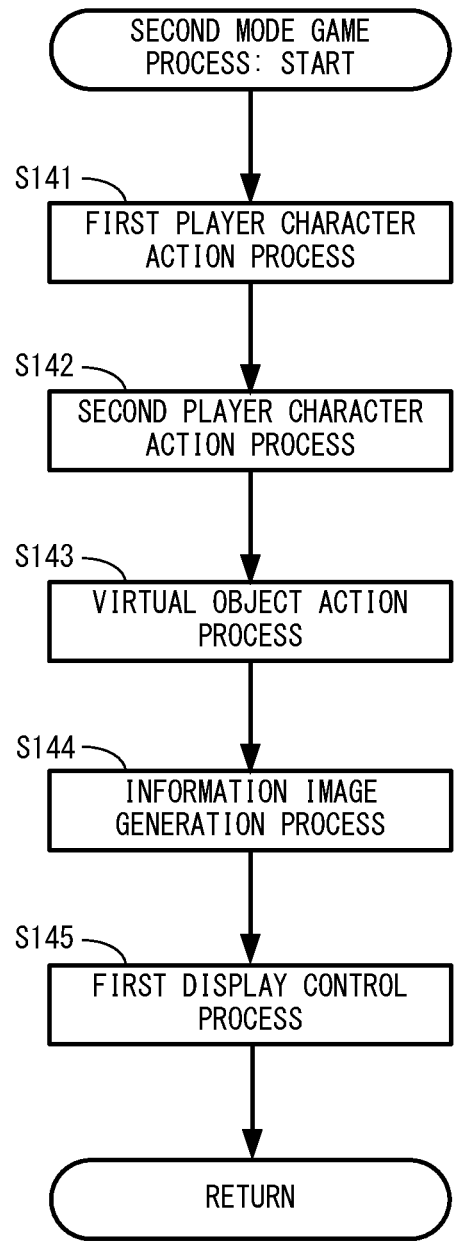
FIG. 19 is a subroutine showing a non-limiting detailed example of a second mode game process performed in step S126 in FIG. 17.

Next, with reference to FIGS. 17 to 19, a detailed example of information processing (game processing) according to the exemplary embodiment is described. FIG. 17 is a flow chart showing an example of game processing executed by the game system 1. FIG. 18 is a subroutine showing a detailed example of a first mode game process performed in step S125 in FIG. 17. FIG. 19 is a subroutine showing a detailed example of a second mode game process performed in step S126 in FIG. 17. In the exemplary embodiment, a series of processes shown in FIGS. 17 to 19 is performed by the processor 81 executing a communication program or a predetermined application program (a game program) included in the various programs Pa. Further, the information processing shown in FIGS. 17 to 19 is started at any timing.

It should be noted that the processes of all of the steps in the flow charts shown in FIGS. 17 to 19 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow charts. Alternatively, a processor or a dedicated circuit other than the processor 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 17 to 19 may be executed by the cooperation of a plurality of information processing apparatuses including the main body apparatus 2.

In FIG. 17, the processor 81 performs initialization in the game processing (step S120), and the processing proceeds to the next step. For example, in the initialization, the processor 81 initializes parameters for performing the processing described below.

Next, the processor 81 acquires operation data from each of the left controller 3 and/or the right controller 4 and updates the operation data Da (step S121), and the processing proceeds to the next step.

Next, the processor 81 acquires inertial data (acceleration data and/or angular velocity data) from the inertial sensors (the acceleration sensor 89 and/or the angular velocity sensor 90) provided in the main body apparatus 2 and updates the acceleration data Dc and/or the angular velocity data Db (step S122), and the processing proceeds to the next step.

Next, the processor 81 determines the orientation of the main body apparatus 2 (step S123), and the processing proceeds to the next step. For example, using the acceleration data and/or the angular velocity data stored in the angular velocity data Db and/or the acceleration data Dc, the processor 81 calculates a gravity vector of a gravitational acceleration acting on the main body apparatus 2 and calculates a y-axis direction component of the gravity vector. Then, when the orientation flag indicated by the orientation flag data Dh is set to on, i.e., the vertically-placed state, and if the magnitude of the y-axis direction component is less than or equal to a second threshold (or a value including the positivity and negativity of the y-axis direction component is greater than or equal to the second threshold), the processor 81 sets the orientation flag to off, i.e., the horizontally-placed state, thereby updating the orientation flag data Dh (see FIG. 15). Further, when the orientation flag indicated by the orientation flag data Dh is set to off, i.e., the horizontally-placed state, and if the magnitude of the y-axis direction component is greater than or equal to a first threshold (or a value including the positivity and negativity of the y-axis direction component is less than or equal to the first threshold), the processor 81 sets the orientation flag to on, i.e., the vertically-placed state, thereby updating the orientation flag data Dh (see FIG. 14). It should be noted that when the main body apparatus 2 connected to the cradle outputs an image to an external device (e.g., the stationary monitor), the processor 81 sets the orientation flag to on, thereby updating the orientation flag data Dh. It should be noted that based on inertial data of the inertial sensors, a computer for calculating an orientation calculates the orientation of the information processing apparatus, and as an example, corresponds to the processor 81 that performs the process of step S123.

Next, the processor 81 determines whether or not the orientation of the main body apparatus 2 is in the vertically-placed state (step S124). For example, when the orientation flag indicated by the orientation flag data Dh is set to on, the determination is affirmative in the above step S124. Then, when the orientation of the main body apparatus 2 is in the vertically-placed state, the processing proceeds to step S125.

On the other hand, when the orientation of the main body apparatus 2 is in the horizontally-placed state, the processing proceeds to step S126. It should be noted that a computer for setting a mode sets to a first mode a case where the information processing apparatus is in an orientation in which the screen is closer to vertical than a predetermined reference, and sets to a second mode a case where an external video device is not connected to a video output section, and the information processing apparatus is in an orientation in which the screen is closer to horizontal than the reference, and as an example, corresponds to the processor 81 that performs the process of step S124.

In step S125, the processor 81 performs a first mode game process, and the processing proceeds to step S127. With reference to FIG. 18, a description is given below of the first mode game process performed in step S127.

In FIG. 18, the processor 81 performs an action process on the first player character PC1 (step S131), and the processing proceeds to the next step. For example, with reference to operation data acquired from the controller for operating the first player character PC1 (e.g., the left controller 3 operated by the first user) in the operation data acquired in the above step S121, the processor 81 sets the motion of the first player character PC1 in the first mode corresponding to the operation data. Then, based on the set motion of the first player character PC1, the processor 81 sets the position, the direction, the orientation, the action, and the like of the first player character PC1 in the virtual space, thereby updating the first player character action data De. It should be noted that in the process of the above step S131, for the association between a direction input to the direction input section (e.g., the analog stick 32) of the controller for operating the first player character PC1 (e.g., the left controller 3) and the motion direction of the first player character PC1 in the virtual space, as described above, settings based on the orientation of the main body apparatus 2 in the first mode (the vertically-placed state; see FIGS. 8, 9, and 12) are used.

Next, the processor 81 performs an action process on the second player character PC2 (step S132), and the processing proceeds to the next step. For example, with reference to operation data acquired from the controller for operating the second player character PC2 (e.g., the right controller 4 operated by the second user) in the operation data acquired in the above step S121, the processor 81 sets the motion of the second player character PC2 in the first mode corresponding to the operation data. Then, based on the set motion of the second player character PC2, the processor 81 sets the position, the direction, the orientation, the action, and the like of the second player character PC2 in the virtual space, thereby updating the second player character action data Df It should be noted that in the process of the above step S132, for the association between a direction input to the direction input section (e.g., the analog stick 52) of the controller for operating the second player character PC2 (e.g., the right controller 4) and the motion direction of the second player character PC2 in the virtual space, as described above, settings based on the orientation of the main body apparatus 2 in the first mode (the vertically-placed state; see FIGS. 8, 9, and 12) are used.

Next, the processor 81 performs an action process on the virtual object OBJ (step S133), and the processing proceeds to the next step. For example, in accordance with the actions of the first player character PC1 and/or the second player character PC2 and the operation data acquired in the above step S121, the processor 81 sets the motion of the virtual object OBJ in the first mode. Then, based on the set motion of the virtual object OBJ, the processor 81 sets the position, the moving direction, and the like of the virtual object OBJ in the virtual space, thereby updating the virtual object action data Dg. It should be noted that in the process of the above step S133, for the association between directions input to the direction input sections (e.g., the analog sticks 32 and 52) of the controllers for operating the first player character PC1 and/or the second player character PC2 and the motion direction of the virtual object OBJ in the virtual space, as described above, settings based on the orientation of the main body apparatus 2 in the first mode (the vertically-placed state; see FIGS. 8, 9, and 12) are used.

Next, the processor 81 generates an information image (step S134), and the processing proceeds to the next step. As an example, the processor 81 generates an information image (e.g., the information image I1 or the information image I2) for informing both the first user and the second user of information regarding the played game, the player characters, and the like. As another example, the processor 81 generates an information image (e.g., the information images I3 or the information images I4) for informing one of the first user and the second user of information regarding the played game, the player characters, and the like. It should be noted that a computer for executing game processing executes predetermined game processing by controlling the first operation target based on first operation data acquired from a first operation device and controlling the second operation target based on second operation data acquired from a second operation device, and as an example, corresponds to the processor 81 that performs the processes of steps S131 to S134.

Next, the processor 81 performs a first display control process for generating a display image for the first mode and displaying the display image on the display screen (step S135), and the processing of this subroutine ends. For example, based on the first player character action data De, the second player character action data Df, and the virtual object data Dg, the processor 81 places the first player character PC1, the second player character PC2, and the virtual object OBJ in the virtual space. Further, the processor 81 places the information image I generated in the above step S134 at a predetermined position in the virtual space such that the up-down direction of the information image is the up-down direction of the virtual space. Then, the processor 81 places the virtual camera such that the line-of-sight direction of the virtual camera is a first line-of-sight direction (e.g., the direction in which the first player character PC1, the second player character PC2, the virtual object OBJ, and the information image I are viewed from behind the first player character PC1 or the second player character PC2), generates a virtual space image viewed from the virtual camera, and displays the virtual space image on the display 12. It should be noted that the information image I may be combined in a superimposed manner with a virtual space image in which the virtual space where the first player character PC1, the second player character PC2, the virtual object OBJ, and the like are placed is viewed from the virtual camera. It should be noted that a computer for generating a game image, based on a virtual camera placed in the virtual space, generates a game image including the first operation target and the second operation target and further including, between a first information image indicating first information and a second information image indicating second information, at least the first information image, and as an example, corresponds to the processor 81 that performs the process of step S135.

Referring back to FIG. 17, when it is determined in the above step S124 that the orientation of the main body apparatus 2 is in the horizontally-placed state, the processor 81 performs a second mode game process (step S126), and the processing proceeds to step S127.

With reference to FIG. 19, a description is given below of the second mode game process performed in the above step S126.

In FIG. 19, the processor 81 performs an action process on the first player character PC1 (step S141), and the processing proceeds to the next step. For example, with reference to operation data acquired from the controller for operating the first player character PC1 (e.g., the left controller 3 operated by the first user) in the operation data acquired in the above step S121, the processor 81 sets the motion of the first player character PC1 in the second mode corresponding to the operation data. Then, based on the set motion of the first player character PC1, the processor 81 sets the position, the direction, the orientation, the action, and the like of the first player character PC1 in the virtual space, thereby updating the first player character action data De. It should be noted that in the process of the above step S141, for the association between a direction input to the direction input section (e.g., the analog stick 32) of the controller for operating the first player character PC1 (e.g., the left controller 3) and the motion direction of the first player character PC1 in the virtual space, as described above, settings based on the orientation of the main body apparatus 2 in the second mode (the horizontally-placed state; see FIGS. 10, 11, and 13) are used.

Next, the processor 81 performs an action process on the second player character PC2 (step S142), and the processing proceeds to the next step. For example, with reference to operation data acquired from the controller for operating the second player character PC2 (e.g., the right controller 4 operated by the second user) in the operation data acquired in the above step S121, the processor 81 sets the motion of the second player character PC2 in the second mode corresponding to the operation data. Then, based on the set motion of the second player character PC2, the processor 81 sets the position, the direction, the orientation, the action, and the like of the second player character PC2 in the virtual space, thereby updating the second player character action data Df It should be noted that in the process of the above step S142, for the association between a direction input to the direction input section (e.g., the analog stick 52) of the controller for operating the second player character PC2 (e.g., the right controller 4) and the motion direction of the second player character PC2 in the virtual space, as described above, settings based on the orientation of the main body apparatus 2 in the second mode (the horizontally-placed state; see FIGS. 10, 11, and 13) are used.

Next, the processor 81 performs an action process on the virtual object OBJ (step S143), and the processing proceeds to the next step. For example, in accordance with the actions of the first player character PC1 and/or the second player character PC2 and the operation data acquired in the above step S121, the processor 81 sets the motion of the virtual object OBJ in the second mode. Then, based on the set motion of the virtual object OBJ, the processor 81 sets the position, the moving direction, and the like of the virtual object OBJ in the virtual space, thereby updating the virtual object action data Dg. It should be noted that in the process of the above step S143, for the association between directions input to the direction input sections (e.g., the analog sticks 32 and 52) of the controllers for operating the first player character PC1 and/or the second player character PC2 and the motion direction of the virtual object OBJ in the virtual space, as described above, settings based on the orientation of the main body apparatus 2 in the second mode (the horizontally-placed state; see FIGS. 10, 11, and 13) are used.

Next, the processor 81 generates an information image (step S144), and the processing proceeds to the next step. As an example, the processor 81 generates an information image (e.g., the information image I1 or the information image I2) for informing both the first user and the second user of information regarding the played game, the player characters, and the like. As another example, the processor 81 generates an information image (e.g., the information images I3 or the information images I4) for informing one of the first user and the second user of information regarding the played game, the player characters, and the like. It should be noted that a computer for executing game processing executes predetermined game processing by controlling the first operation target based on first operation data acquired from a first operation device and controlling the second operation target based on second operation data acquired from a second operation device, and as another example, corresponds to the processor 81 that performs the processes of steps S141 to S144.

Next, the processor 81 performs a second display control process for generating a display image for the second mode and displaying the display image on the display screen (step S145), and the processing of this subroutine ends. For example, based on the first player character action data De, the second player character action data Df, and the virtual object data Dg, the processor 81 places the first player character PC1, the second player character PC2, and the virtual object OBJ in the virtual space. Then, in the information image I generated in the above step S144, the processor 81 places information image for informing only the first user of information at a predetermined position in the virtual space such that the up-down direction of the information image is the horizontal direction of the virtual space and is one direction (e.g., the right direction) of the main body apparatus 2. Further, in the information image I generated in the above step S144, the processor 81 places an information image for informing only the second user of information at a predetermined position in the virtual space such that the up-down direction of the information image is the horizontal direction of the virtual space and is a direction (e.g., the left direction) opposite to the one direction of the main body apparatus 2. Further, in the information image I generated in the above step S144, the processor 81 prepares information images for informing both the first user and the second user for the first user and the second user and places the information images at predetermined positions in the virtual space such that the up-down direction of the information image for the first user is the one direction, and the up-down direction of the information image for the second user is the opposite direction. Then, the processor 81 places the virtual camera such that the line-of-sight direction of the virtual camera is a second line-of-sight direction (e.g., a bird's-eye viewpoint or an overhead viewpoint) looking down on the first player character PC1, the second player character PC2, the virtual object OBJ, and the information image I, which is further downward in the virtual space than the first line-of-sight direction. Then, the processor 81 generates a virtual space image viewed from the virtual camera and displays the virtual space image on the display 12. It should be noted that the information image I may be combined in a superimposed manner with a virtual space image in which the virtual space where the first player character PC1, the second player character PC2, the virtual object OBJ, and the like are placed is viewed from the virtual camera. It should be noted that a computer for generating a game image, based on a virtual camera placed in the virtual space, generates a game image including the first operation target and the second operation target and further including, between a first information image indicating first information and a second information image indicating second information, at least the first information image, and as another example, corresponds to the processor 81 that performs the process of step S145.

Referring back to FIG. 17, in step S127, the processor 81 determines whether or not the game is to be ended. In the above step S127, examples of a condition for ending the game include: the fact that the result of the game is finalized; and the fact that the user performs the operation of ending the game. When the game is not to be ended, the processing returns to the above step S121, and the process of step S121 is repeated. When the game is to be ended, the processing of the flow chart ends. Hereinafter, the series of processes of steps S121 to S127 are repeatedly executed until it is determined in step S127 that the game is to be ended.

As described above, in the exemplary embodiment, it is possible to perform a game in different play styles in accordance with the state of the main body apparatus 2 including the display 12 and increase the variety when a game is performed by placing the main body apparatus 2. Further, the information image I displayed on the display 12 is displayed in the state where the information image I is easy for each user to view in accordance with the state of the main body apparatus 2. Thus, it is easy for the users to understand the game.

It should be noted that in the above exemplary embodiment, in the first mode, the virtual camera is placed at the position where the first player character PC1 and the second player character PC2 are viewed from behind the second player character PC2 (i.e., in front of the first player character PC1). Alternatively, the virtual camera may be placed at another viewpoint. As an example, when the first player character PC1 and the second player character PC2 are placed in the virtual space while facing in the same direction, the virtual camera may be placed at the position where the first player character PC1 and the second player character PC2 are viewed from behind the first player character PC1 and the second player character PC2. As another example, in the first mode, the virtual camera may be placed at the position where the first player character PC1 and the second player character PC2 are viewed from the sides of the first player character PC1 and the second player character PC2. In this case, it is possible to display a game image suitable for a case where the game progresses while the first player character PC1 and the second player character PC2 proceed in the same direction.

Further, in the above exemplary embodiment, an exemplary game where a baseball board game (a table baseball game or a baseball pinball) is played is used. Alternatively, the exemplary embodiment may be applied to another game. For example, the exemplary embodiment can be applied to various games such as a table soccer game, a table athletic game, and a sugoroku game. As an example, when the exemplary embodiment is applied to the table soccer game, it is possible that a user is urged to play in either of the first mode and the second mode in accordance with the game scene. Specifically, in the table soccer game, it is possible that in a particular scene where the first player character PC1 and the second player character PC2 confront each other while facing each other (e.g., the scene of a penalty kick where a kicker and a goalkeeper confront each other one-on-one), the user is urged to play in the first mode so as to play viewing a game image from behind the goalkeeper. It is possible that in a normal scene, the user is urged to play in the second mode so as to play viewing a game image looking down on the entirety of a soccer field.

Further, in the above description, a form is used in which the first user and the second user perform game play. Alternatively, the number of users performing game play using the game system 1 may be three or more, or may be one. When three or more users perform game play, three or more controllers wirelessly connected to the main body apparatus 2 may be used, and in the second mode, the direction of the information image I for each user may be adjusted in accordance with the play position of the user relative to the main body apparatus 2.

Further, in the above exemplary embodiment, a method for detecting the orientation of the main body apparatus 2 is a mere example. Alternatively, the orientation of the main body apparatus 2 may be detected using another method or another piece of data. Further, the controller for controlling the action of the first player character PC1 or the second player character PC2 may be not only the left controller 3 or the right controller 4, but also another controller.

Further, an additional apparatus (e.g., a cradle) may be any additional apparatus attachable to and detachable from the main body apparatus 2. The additional apparatus may or may not have the function of charging the main body apparatus 2 as in the exemplary embodiment.

Further, the game system 1 may be any apparatus, and may be a mobile game apparatus, any mobile electronic device (a PDA (Personal Digital Assistant), a mobile phone, a personal computer, a camera, a tablet, or the like) or the like.

Further, the above descriptions have been given using an example where the game system 1 performs information processing (game processing) and a communication process. Alternatively, another apparatus may perform at least some of the processing steps. For example, if the game system 1 is further configured to communicate with another apparatus (e.g., another server, another image display device, another game apparatus, or another mobile terminal), the other apparatus may move in conjunction with to perform the processing steps. Another apparatus may thus perform at least some of the processing steps, thereby enabling processing similar to that described above. Further, the above information processing (game processing) can be performed by a processor or the cooperation of a plurality of processors, the processor or the plurality of processors included in an information processing system including at least one information processing apparatus. Further, in the above exemplary embodiment, information processing can be performed by the processor 81 of the game system 1 executing a predetermined program. Alternatively, part or all of the processing of the flow charts may be performed by a dedicated circuit included in the game system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information processing described above are merely illustrative. Thus, it goes without saying that the exemplary embodiment can be achieved also with other orders, other values, and other conditions.

Further, the above program may be supplied to the game system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as a game system, a game program, a game apparatus, a game processing method, and the like that are capable of, for example, increasing the variety when a game is performed.

What is claimed is:

1. A game system including an information processing apparatus, and a first operation device and a second operation device wirelessly connectable to the information processing apparatus, the information processing apparatus comprising:
   a screen on which an image is displayable;
   an inertial sensor;

a video output configured to, when an external video device different from the screen is connected to the video output, output a video to the external video device; and at least one computer configured to:
based on inertial data of the inertial sensor, calculate an orientation of the information processing apparatus;
execute game processing by, in a virtual space, controlling a first operation target based on first operation data acquired from the first operation device and controlling a second operation target based on second operation data acquired from the second operation device;
set the game processing to operate in one of at least first and second modes, the first mode being set in a case where an external video device is connected to the video output, the first mode being set in a case where the information processing apparatus is in an orientation in which the screen faces forward more than upward, and the second mode being set in a case where an external video device is not connected to the video output and the information processing apparatus is in an orientation in which the screen faces upward more than forward; and
based on a virtual camera placed in the virtual space, generate a game image including the first operation target and the second operation target and further including, between a first information image indicating first information and a second information image indicating second information, at least the first information image, wherein in the generating of the game image,
when the first mode is set, the virtual camera is set such that a line-of-sight direction of the virtual camera is a first line-of-sight direction, and a game image in which the first information image is placed in a first direction or a game image in which the first information image and the second information image are placed in the same direction is generated, and
when the second mode is set, the virtual camera is set such that the line-of-sight direction of the virtual camera is a second line-of-sight direction that is further downward in the virtual space than the first line-of-sight direction, and a game image in which the plurality of first information images are placed in different directions or a game image in which the first information image and the second information image are placed in different directions is generated.

2. The game system according to claim 1, wherein:
the first operation device and the second operation device each include a directional input,
the first operation data includes first direction input data acquired from the directional input of the first operation device,
the second operation data includes second direction input data acquired from the directional input of the second operation device,
in the executing of the game processing, the first operation target is moved in the virtual space based on the first direction input data, and the second operation target is moved in the virtual space based on the second direction input data, and
in the executing of the game processing, regarding at least one of the first direction input data and the second direction input data, an association between a direction input to the directional input and a direction in the virtual space is changed between the first mode and the second mode.

3. The game system according to claim 2, wherein in the executing of the game processing,
when the first mode is set, in accordance with the fact that the directional input of the first operation device is operated in a first direction, the operation target is controlled as an indication indicating a second direction in the virtual space,
when the second mode is set, in accordance with the fact that the directional input of the first operation device is operated in the first direction, the operation target is controlled as an indication indicating a third direction opposite to the second direction in the virtual space,
when the first mode is set, in accordance with the fact that the directional input of the second operation device is operated in a fourth direction, the operation target is controlled as an indication indicating a fifth direction in the virtual space, and
when the second mode is set, in accordance with the fact that the directional input of the second operation device is operated in the fourth direction, the operation target is controlled as an indication indicating the fifth direction in the virtual space.

4. The game system according to claim 1, wherein:
the first information includes a letter and/or a number for a user operating the first operation device, and
the second information includes a letter and/or a number for a user operating the second operation device.

5. The game system according to claim 1, wherein in the generating of the game image, when the first mode is set, the virtual camera is placed behind one of the first operation target and the second operation target, and a game image including the first operation target and the second operation target is generated.

6. The game system according to claim 1, wherein in the generating of the game image, when the second mode is set, the virtual camera is set at a bird's-eye viewpoint, and a game image including the first operation target and the second operation target is generated.

7. The game system according to claim 1, wherein the game processing provides, in the virtual space, a game where the first operation target is associated with flying a virtual object based on the first operation data, and the second operation target is associated with hitting back the virtual object based on the second operation data.

8. The game system according to claim 1, wherein the game processing provides, in the virtual space, a game where the first operation target and the second operation target compete against each other while facing each other.

9. A non-transitory computer-readable storage medium having stored therein instructions executable by a computer included in an information processing apparatus wirelessly connectable to a first operation device and a second operation device,
the information processing apparatus comprising:
a screen on which an image is displayable;
an inertial sensor; and
a video output configured to, when an external video device different from the screen is connected to the video output, output a video to the external video device;
the instructions, when executed, causing the computer to perform operations comprising:

based on inertial data of the inertial sensor, calculating an orientation of the information processing apparatus;

executing game processing by, in a virtual space, controlling a first operation target based on first operation data acquired from the first operation device and controlling a second operation target based on second operation data acquired from the second operation device;

set the game processing to operate in one of at least first and second modes, the first mode being set in a case where an external video device is connected to the video output, the first being set in a case where the information processing apparatus is in an orientation in which the screen faces forward more than upward, and the second mode being set in a case where an external video device is not connected to the video output and the information processing apparatus is in an orientation in which the screen faces upward more than forward; and based on a virtual camera placed in the virtual space, generating a game image including the first operation target and the second operation target and further including, between a first information image indicating first information and a second information image indicating second information, at least the first information image, wherein in the generating of the game image, when the first mode is set, the virtual camera is set such that a line-of-sight direction of the virtual camera is a first line-of-sight direction, and a game image in which the first information image is placed in a first direction or a game image in which the first information image and the second information image are placed in the same direction is generated, and when the second mode is set, the virtual camera is set such that the line-of-sight direction of the virtual camera is a second line-of-sight direction that is further downward in the virtual space than the first line-of-sight direction, and a game image in which the plurality of first information images are placed in different directions or a game image in which the first information image and the second information image are placed in different directions is generated.

10. The non-transitory computer-readable storage medium according to claim 9, wherein:

the first operation device and the second operation device each include a directional input, the first operation data includes first direction input data acquired from the directional input of the first operation device, the second operation data includes second direction input data acquired from the directional input of the second operation device, in the executing of the game processing, the first operation target is moved in the virtual space based on the first direction input data, and the second operation target is moved in the virtual space based on the second direction input data, and in the executing of the game processing, regarding at least one of the first direction input data and the second direction input data, an association between a direction input to the directional input and a direction in the virtual space is changed between the first mode and the second mode.

11. The non-transitory computer-readable storage medium according to claim 10, wherein in the executing of the game processing, when the first mode is set, in accordance with the fact that the directional input of the first operation device is operated in a first direction, the operation target is controlled as an indication indicating a second direction in the virtual space, when the second mode is set, in accordance with the fact that the directional input of the first operation device is operated in the first direction, the operation target is controlled as an indication indicating a third direction opposite to the second direction in the virtual space, when the first mode is set, in accordance with the fact that the directional input of the second operation device is operated in a fourth direction, the operation target is controlled as an indication indicating a fifth direction in the virtual space, and when the second mode is set, in accordance with the fact that the directional input of the second operation device is operated in the fourth direction, the operation target is controlled as an indication indicating the fifth direction in the virtual space.

12. The non-transitory computer-readable storage medium according to claim 9, wherein:

the first information includes a letter and/or a number for a user operating the first operation device, and the second information includes a letter and/or a number for a user operating the second operation device.

13. The non-transitory computer-readable storage medium according to claim 9, wherein in the generating of the game image, when the second mode is set, the virtual camera is placed behind one of the first operation target and the second operation target, and a game image including the first operation target and the second operation target is generated.

14. The non-transitory computer-readable storage medium according to claim 9, wherein in the generating of the game image, when the second mode, the virtual camera is set at a bird's-eye viewpoint, and a game image including the first operation target and the second operation target is generated.

15. The non-transitory computer-readable storage medium according to claim 9, wherein the game processing provides, in the virtual space, a game where the first operation target is associated with flying a virtual object based on the first operation data, and the second operation target is associated with hitting back the virtual object based on the second operation data.

16. The non-transitory computer-readable storage medium according to claim 9, wherein the game processing provides, in the virtual space, a game where the first operation target and the second operation target compete against each other while facing each other.

17. A game apparatus wirelessly connectable to a first operation device and a second operation device, the game apparatus comprising:

a screen on which an image is displayable;

an inertial sensor;

a video output configured to, when an external video device different from the screen is connected to the video output, output a video to the external video device; and at least one computer configured to:

based on inertial data of the inertial sensor, calculate an orientation of the information processing apparatus;

execute game processing by, in a virtual space, controlling a first operation target based on first operation data acquired from the first operation device and controlling a second operation target based on second operation data acquired from the second operation device;

set the game processing to operate in one of at least first and second modes, the first mode being set in a case where an external video device is connected to the video output, the first mode being set in a case where the information processing apparatus is in an orientation in which the screen faces forward more than upward, and the second mode being set in a case where an external video device is not connected to the video output and the information processing apparatus is in an orientation in which the screen faces upward more than forward; and based on a virtual camera placed in the virtual space, generate a game image including the first operation target and the second operation target and further including, between a first information image indicating first information and a second information image indicating second information, at least the first information image, wherein in the generating of the game image, when the first mode is set, the virtual camera is set such that a line-of-sight direction of the virtual camera is a first line-of-sight direction, and a game image in which the first information image is placed in a first direction or a game image in which the first information image and the second information image are placed in the same direction is generated, and when the second mode is set, the virtual camera is set such that the line-of-sight direction of the virtual camera is a second line-of-sight direction that is further downward in the virtual space than the first line-of-sight direction, and a game image in which the plurality of first information images are placed in different directions or a game image in which the first information image and the second information image are placed in different directions is generated.

18. A game processing method using an information processing apparatus, and a first operation device and a second operation device wirelessly connectable to the information processing apparatus, the information processing apparatus comprising:
a screen on which an image is displayable;
an inertial sensor; and
a video output configured to, when an external video device different from the screen is connected to the video output, output a video to the external video device, the game processing method comprising:
based on inertial data of the inertial sensor, calculating an orientation of the information processing apparatus;

executing game processing by, in a virtual space, controlling a first operation target based on first operation data acquired from the first operation device and controlling a second operation target based on second operation data acquired from the second operation device;

setting the game processing to operate in one of at least first and second modes, the first mode being set in a case where an external video device is connected to the video output, the first mode being set in a case where the information processing apparatus is in an orientation in which the screen faces forward more than upward, and the second mode being set in a case where an external video device is not connected to the video output and the information processing apparatus is in an orientation in which the faces upward more than forward; and based on a virtual camera placed in the virtual space, generating a game image including the first operation target and the second operation target and further including, between a first information image indicating first information and a second information image indicating second information, at least the first information image, wherein in the generating of the game image, when the first mode is set, the virtual camera is set such that a line-of-sight direction of the virtual camera is a first line-of-sight direction, and a game image in which the first information image is placed in a first direction or a game image in which the first information image and the second information image are placed in the same direction is generated, and when the second mode is set, the virtual camera is set such that the line-of-sight direction of the virtual camera is a second line-of-sight direction that is further downward in the virtual space than the first line-of-sight direction, and a game image in which the plurality of first information images are placed in different directions or a game image in which the first information image and the second information image are placed in different directions is generated.

* * * * *